US011895026B2

(12) United States Patent
Zhuang et al.

(10) Patent No.: US 11,895,026 B2
(45) Date of Patent: *Feb. 6, 2024

(54) SERVICE FUNCTION CHAINING SFC-BASED PACKET FORWARDING METHOD, APPARATUS, AND SYSTEM

(71) Applicant: HUAWEI TECHNOLOGIES CO., LTD., Guangdong (CN)

(72) Inventors: Shunwan Zhuang, Beijing (CN); Junlin Zhang, Beijing (CN); Nan Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,861

(22) Filed: Oct. 14, 2022

(65) Prior Publication Data

US 2023/0048749 A1 Feb. 16, 2023

Related U.S. Application Data

(63) Continuation of application No. 17/079,415, filed on Oct. 23, 2020, now Pat. No. 11,516,130, which is a
(Continued)

(51) Int. Cl.
*H04L 45/74* (2022.01)
*H04L 45/302* (2022.01)
*H04L 45/64* (2022.01)

(52) U.S. Cl.
CPC ............ *H04L 45/74* (2013.01); *H04L 45/306* (2013.01); *H04L 45/64* (2013.01)

(58) Field of Classification Search
None
See application file for complete search history.

(56) References Cited

U.S. PATENT DOCUMENTS 7,688,743 B2 * 3/2010 Cohen .................... H04L 45/54
370/252
9,722,927 B2 * 8/2017 Zhang ................... H04L 45/745
(Continued)

FOREIGN PATENT DOCUMENTS

CN  101911599 A  12/2010
CN  102216977 A  10/2011
(Continued)

OTHER PUBLICATIONS

Li, H., et al,"Service Function Chaining (SFC) Control Plane Components and Requirements", draft-ww-sfc-control-plane-06, Jun. 8, 2015, 27 pages.
(Continued)

*Primary Examiner* — Hong S Cho

(57) ABSTRACT

A packet forwarding method, an apparatus, and a system for service function chaining (SFC)-based packet forwarding are disclosed. The packet forwarding method performed by a first service function forwarding node includes receiving a packet forwarding rule from a control node, where the packet forwarding rule indicating a mapping relationship between a match item of traffic characteristic information of a packet and route prefix information; receiving a first packet, where a header of the first packet carries traffic characteristic information of the first packet; determining, based on the packet forwarding rule, target route prefix information corresponding to the traffic characteristic information of the first packet; determining target next-hop information based on the target route prefix information, and forwarding the first packet based on the target next-hop information.

10 Claims, 5 Drawing Sheets

Related U.S. Application Data continuation of application No. 16/236,782, filed on Dec. 31, 2018, now Pat. No. 10,833,986, which is a continuation of application No. PCT/CN2016/088250, filed on Jul. 1, 2016.

(56) References Cited

U.S. PATENT DOCUMENTS

| | | | |
|---|---|---|---|
| 10,050,859 B2* | 8/2018 | Kim | H04L 41/0654 |
| 10,084,703 B2* | 9/2018 | Kumar | H04L 45/7453 |
| 10,116,553 B1* | 10/2018 | Penno | H04L 45/306 |
| 10,187,306 B2* | 1/2019 | Nainar | H04L 45/64 |
| 10,833,986 B2 | 11/2020 | Zhuang et al. | |
| 2014/0313928 A1 | 10/2014 | Fernando et al. | |
| 2015/0003455 A1 | 1/2015 | Haddad et al. | |
| 2015/0095484 A1 | 4/2015 | Ristock et al. | |
| 2015/0236948 A1 | 8/2015 | Dunbar et al. | |
| 2015/0295831 A1 | 10/2015 | Kumar et al. | |
| 2015/0326473 A1 | 11/2015 | Dunbar et al. | |
| 2015/0358235 A1 | 12/2015 | Zhang et al. | |
| 2016/0119253 A1 | 4/2016 | Kang et al. | |
| 2016/0294681 A1* | 10/2016 | Khakpour | H04L 45/306 |
| 2017/0015582 A1 | 1/2017 | Brouwer | |
| 2017/0019373 A1 | 1/2017 | Meng et al. | |
| 2017/0244631 A1* | 8/2017 | Guichard | H04L 45/74 |
| 2019/0140947 A1 | 5/2019 | Zhuang et al. | |
| 2021/0044525 A1 | 2/2021 | Zhuang et al. | |

FOREIGN PATENT DOCUMENTS

| | | |
|---|---|---|
| CN | 104380658 A | 2/2015 |
| CN | 104734956 A | 6/2015 |
| CN | 104869065 A | 8/2015 |
| CN | 104954245 A | 9/2015 |
| CN | 105099919 A | 11/2015 |
| CN | 105207995 A | 12/2015 |
| CN | 105337852 A | 2/2016 |
| CN | 105337855 A | 2/2016 |
| CN | 105379218 A | 3/2016 |
| CN | 105406992 A | 3/2016 |
| CN | 105471817 A | 4/2016 |
| CN | 105577413 A | 5/2016 |
| CN | 105577416 A | 5/2016 |
| CN | 105577502 A | 5/2016 |
| WO | 2006090473 A1 | 8/2006 |
| WO | 2015100644 A1 | 7/2015 |
| WO | 2016023499 A1 | 2/2016 |

OTHER PUBLICATIONS

Boucadair, M.,Ed., et al, "Service Function Chaining (SFC) Control Plane ComponentsandRequirements", XP015113156, draft-ietf-sfc-control-plane-06, May 20, 2016, pp. 1-27.
Walton, D., et al, "Advertisement of Multiple Paths in BGP," draft-ietf-idr-add-paths-10, Oct. 24, 2014, 8 pages.
Gredler,H., Ed., et al,"North-Bound Distribution of Link-State and TE Information using BGP," draft-ietf-idr-ls-distribution-11, Jun. 4, 2015, 45 pages.
Quinn, P.,Ed.et al,"Network Service Header," draft-ietf-sfc-nsh-05, May 26, 2016, 38 pages.
K. Lougheed et al: "A Border Gateway Protocol (BGP)", Network Working Group, rfc1105, Jun. 1989, 17 pages.
K. Lougheed et al: "A Border Gateway Protocol (BGP)", Network Working Group, rfc1163, Jun. 1990, 29 pages.
K. Lougheed et al: A Border Gateway Protocol 3 (BGP-3), Network Working Group, rfc1267, Oct. 1991, 35 pages.
J. Reynolds et al. Assigned Numbers. Network Working Group, RFC1700. Oct. 1994. 230 pages.
Y. Rekhter, Ed. Et al: "A Border Gateway Protocol 4 (BGP-4)", Network Working Group, Category: Standards Track, rfc4271, Jan. 2006, 104 pages.
E. Rosen, BGPMPLS IP Virtual private networks(vpns),RFC4364. Feb. 2006, 42 pages.
T. Bates et al, BGP Route Reflection: An Alternative to Full Mesh Internal BGP (IBGP). RFC4456, Apr. 2006, 12 pages.
T. Bates et al: "Multiprotocol Extensions for BGP-4", Network Working Group, Category: Standards Track, rfc4760, Jan. 2007, 12 pages.
J. Scudder et al, Capabilities Advertisement with BGP-4. RFC5492, Feb. 2009, 7 pages.
P. Marques et al: "Dissemination of Flow Specification Rules", Network Working Group, Category: Standards Track, rfc5575, Aug. 2009, 22 pages.
Chen, E., Ed., et al, "Revised Error Handling for BGP Update Messages",Internet Engineering Task Force (IETF), RFC 7606, Aug. 2015, total 19 pages.
Gu Rong et al.,"Analysis on network scheme and resolution test of SDN/NFV technology co-deployed in cloud datacenter", Dec. 7, 2015, total: 5 pages.
Notice of Allowance issued in CN202110225233.1, dated Sep. 20, 2022, 4 pages.
Office Action issued in CN202110225214.9, dated Mar. 29, 2023, 9 pages.
Request for Comments: 7665, J. Halpern, Ed. Service Function Chaining (SFC) Architecture, Internet Engineering Task Force (IETF), Oct. 2015, 32 pages.
Request for Comments: 7674, J. Haas, Ed. et al, Clarification of the Flowspec Redirect Extended Community, Internet Engineering Task Force (IETF), Oct. 2015, 7 pages.
Quinn P et al: Network Service Header;draft-ietf-sfc-nsh-05 .txt Network Service Header; Draft ETF-SFC-NSH-05 .TXT Internet Engineering Task Force, IETF; Standard Working Draft Internet Society (ISOC) 4 Rue Des Falaises CH-1205 Geneva, Switzerland May 27, 2016 (May 27, 2016) pp. 1-38, XP015113233 [retrieved on May 27, 2016] total: 33 pages.
Boucadair M et al: Service Function Chaining (SFC) Control Plane Components and Requirements; draft-ietf-sfc-control-plane-06 .txt Service Function Chaining (SFC) Control Plane Components and Requirements; Draft IETF-SFC-CONTROL-PLANE-06 .TXT, Internet Engineering Task Force ETF; Standard Working Draft Internet Society(ISOC) 4 Rue Des Falaises CH-1205 Geneva, Switzerland May 20, 2016 (May 20, 2016) pp. 1-27, xP015113156 [retrieved on May 20, 2016], total: 27pages.
Extended European Search Report issued in EP23163991.5, dated Aug. 30, 2023, 8 pages.
Notice of Allowance issued in CN202110225214.9, dated Sep. 22, 2023, 5 pages.

* cited by examiner

SERVICE FUNCTION CHAINING SFC-BASED PACKET FORWARDING METHOD, APPARATUS, AND SYSTEM

CROSS-REFERENCE TO RELATED APPLICATIONS

This application is a continuation of U.S. patent application Ser. No. 17/079,415 filed on Oct. 23, 2020, which is a continuation of U.S. patent application Ser. No. 16/236,782 filed on Dec. 31, 2018, now U.S. Pat. No. 10,833,986, which is a continuation of International Application No. PCT/CN2016/088250 filed on Jul. 1, 2016. All of the aforementioned applications are hereby incorporated by reference in their entireties.

TECHNICAL FIELD

Embodiments of the present disclosure relate to the communications field, and more further, to a service function chaining (SFC)-based packet forwarding method and an apparatus.

BACKGROUND

SFC is a mechanism for deploying a value-added service. In network communications, a group of devices that have service processing functions (such as a firewall, network address translation (NAT), and deep packet inspection (DPI)) are combined in order, and SFC is formed when traffic passes these service processing functions. A basic SFC architecture includes a control node, a classifier node, a service function forwarding node, a service function node, and the like.

When a packet enters an SFC network from a non-SFC network or is forwarded from a service function path (SFP) to another SFP in an SFC network, the packet needs to be directed. In current technologies, manual configuration is performed on the first service function forwarding node (or referred to as an ingress node or a head node) of the SFC or on a service function forwarding node (or referred to as a node on which two SFPs intersect with each other) shared by two SFPs such that the service function forwarding node forwards the packet based on a specified path. For example, for each packet entering the SFC, a command line is manually entered on the ingress node of the SFC such that the packet enters a specified SFP according to configuration of the command line.

However, a manual configuration method requires professional technical personnel to spend a large amount of time in completing the configuration, with a heavy workload and complex maintenance. For example, when a network topology changes, a node needs to be manually deleted or added. In addition, a configuration error may easily occur when a configuration workload is relatively heavy.

SUMMARY

The present disclosure provides a SFC-based packet forwarding method, an apparatus, and a system, which can implement redirection of a packet forwarding path through automatic configuration that is performed by a control node on a service function forwarding node.

According to a first aspect, the present disclosure provides an SFC-based packet forwarding method. The packet forwarding method includes receiving, by a first service function forwarding node, a packet forwarding rule sent by a control node, where the packet forwarding rule is used to indicate a mapping relationship between a match item of traffic characteristic information of a packet and route prefix information, receiving, by the first service function forwarding node, a first packet, where a header of the first packet carries traffic characteristic information of the first packet, determining, by the first service function forwarding node according to the packet forwarding rule, target route prefix information corresponding to the traffic characteristic information of the first packet, where the first service function forwarding node stores a mapping relationship between at least one piece of route prefix information and at least one piece of next-hop information, the at least one piece of next-hop information is in one-to-one correspondence with at least one next-hop node that is connected to the first service function forwarding node, each piece of next-hop information indicates an address of a corresponding next-hop node, and the at least one piece of route prefix information includes the target route prefix information, determining, by the first service function forwarding node, target next-hop information based on the target route prefix information, and forwarding the first packet based on the target next-hop information.

Therefore, according to the SFC-based packet forwarding method in this embodiment of the present disclosure, the control node and a service function forwarding node synchronize a packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the SFC-based packet forwarding method are more outstanding, convenience, time saving, and labor saving. In addition, automatic configuration performed using a machine also reduces an error rate of manual configuration.

Further, this embodiment of the present disclosure may be applicable to packet directing when a non-SFC packet enters an SFC forwarding plane, for example, directing performed when a common Internet Protocol (IP) packet enters the first service function forwarding node of SFC, or may be applicable to packet directing during forwarding of an SFC packet from one SFP to another SFP, for example, directing during traffic convergence. It should be understood that the foregoing two listed scenarios are merely examples for ease of description of this embodiment of the present disclosure, but shall not be construed as any limitation on the present disclosure. For example, this embodiment of the present disclosure may also be applicable to directing of a packet on an intermediate node of the SFC, and an applicable scenario is not particularly limited in this embodiment of the present disclosure.

With reference to the first aspect, in a first possible implementation of the first aspect, the route prefix information includes an SFP identifier (SPI) and a service index (SI), the SPI identifies an SFP in the SFC, and the SI indicates a location of the first service function forwarding node in the SFP, and receiving, by a first service function forwarding node, a packet forwarding rule sent by a control node includes receiving, by the first service function forwarding node, a Border Gateway Protocol (BGP) flow specification (Flow Spec) packet sent by the control node, where the BGP Flow Spec packet includes a Flow Spec network layer reachability information (NLRI) field and an extended community attribute field, the Flow Spec NLRI field carries the match item of the traffic characteristic information of the packet, the extended community attribute field includes a SPI field and an SI field, the SPI field carries the SPI, and the SI field carries the SI.

In this embodiment of the present disclosure, extension is made based on the existing BGP protocol. To be specific, match item information is carried in the NLRI field in the BGP Flow Spec packet, and to-be-executed action field information is carried in the extended community attribute field in the BGP Flow Spec packet.

With reference to the first aspect and the foregoing possible implementation, in a second possible implementation of the first aspect, the packet forwarding rule includes a first mapping relationship between a match item of traffic characteristic information of a non-SFC packet and route prefix information, and the target route prefix information includes a target SPI and a target SI, and determining, by the first service function forwarding node according to the packet forwarding rule, target route prefix information corresponding to the traffic characteristic information of the first packet includes, when the header of the first packet does not carry an SFC packet identifier, determining, by the first service function forwarding node, that the first packet is a non-SFC packet, and determining, by the first service function forwarding node, the target SPI and the target SI based on the first mapping relationship and the traffic characteristic information of the first packet, where the SFC packet identifier includes the SPI or the SI.

It may be determined, based on whether the header of the first packet carries the SFC packet identifier, whether the first packet is an SFC packet. When the first packet is a non-SFC packet, the target SPI and the target SI are determined based on the first mapping relationship, further the target next-hop information is determined based on the target SPI and the target SI, and the first packet is forwarded based on the target next-hop information.

With reference to the first aspect and the foregoing possible implementations, in a third possible implementation of the first aspect, the packet forwarding rule includes a second mapping relationship between a match item of traffic characteristic information of an SFC packet and route prefix information, and the match item of the traffic characteristic information of the SFC packet includes at least one of a packet type, a source SPI, and a source SPI and a source SI, where the source SPI is used to identify a source SFP in which the SFC packet resides, and the source SI is used to indicate a location, of a service function forwarding node on which the SFC packet resides, in the source SFP.

A service function forwarding node can directly match an SFC packet using a newly added match item of traffic characteristic information of an SFC packet such that traffic matching of a non-SFC packet needed when the packet enters the first node of the SFC is avoided, thereby greatly reducing a matching workload and improving packet forwarding efficiency.

With reference to the first aspect and the foregoing possible implementations, in a fourth possible implementation of the first aspect, the target route prefix information includes a target SPI and a target SI, receiving, by the first service function forwarding node, a first packet, where a header of the first packet carries traffic characteristic information of the first packet includes receiving, by the first service function forwarding node, the first packet, where the header of the first packet carries a first SPI and a first SI, the first SPI is a source SPI corresponding to the first packet, and the first SI is a source SI corresponding to the first packet, and determining, by the first service function forwarding node according to the packet forwarding rule, target route prefix information corresponding to the traffic characteristic information of the first packet includes, when a packet type of the first packet is an SFC packet, determining, by the first service function forwarding node, the target SPI and the target SI based on the second mapping relationship, determining, by the first service function forwarding node, the target SPI and the target SI based on the first SPI and the second mapping relationship, or determining, by the first service function forwarding node, the target SPI and the target SI based on the first SPI, the first SI, and the second mapping relationship.

The first packet is matched based on the match item of the traffic characteristic information that is included in the second mapping relationship to determine the target SPI and the target SI that match the first packet, further the target next-hop information is determined based on the target SPI and the target SI, and the first packet is forwarded based on the target next-hop information.

According to a second aspect, the present disclosure provides an SFC-based packet forwarding method. The packet forwarding method includes determining, by a control node, a packet forwarding rule, where the packet forwarding rule is used to indicate a mapping relationship between traffic characteristic information of a packet and route prefix information, the route prefix information corresponds to next-hop information, and the next-hop information indicates an address of a next-hop node, and sending, by the control node, the packet forwarding rule to a first service function forwarding node such that the first service function forwarding node forwards a packet according to the packet forwarding rule.

Therefore, according to the SFC-based packet forwarding method in this embodiment of the present disclosure, the control node and a service function forwarding node synchronize a packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the SFC-based packet forwarding method are more outstanding, convenience, time saving, and labor saving. In addition, automatic configuration performed using a machine also reduces an error rate of manual configuration.

With reference to the second aspect, in a first possible implementation of the second aspect, the route prefix information includes an SPI and an SI, the SPI identifies an SFP in the SFC, and the SI indicates a location of the first service function forwarding node in the SFP, and sending, by the control node, the packet forwarding rule to a first service function forwarding node includes sending, by the control node, a BGP Flow Spec packet to the first service function forwarding node, where the BGP Flow Spec packet includes a Flow Spec NLRI field and an extended community attribute field, the Flow Spec NLRI field carries a match item of the traffic characteristic information of the packet, the extended community attribute field includes a SPI field and an SI field, the SPI field carries the SPI, and the SI field carries the SI.

In this embodiment of the present disclosure, extension is made based on the existing BGP protocol. To be specific, match item information is carried in the NLRI field in the BGP Flow Spec packet, and to-be-executed action field information is carried in the extended community attribute field in the BGP Flow Spec packet.

According to a third aspect, the present disclosure provides a service function forwarding node configured to perform the method according to the first aspect or any possible implementation of the first aspect. Further, the service function forwarding node includes modules configured to perform the method according to the first aspect or any possible implementation of the first aspect.

According to a fourth aspect, the present disclosure provides a control node configured to perform the method according to the second aspect or any possible implementation of the second aspect. Further, the control node includes modules configured to perform the method according to the second aspect or any possible implementation of the second aspect.

According to a fifth aspect, the present disclosure provides an SFC-based packet forwarding system, including the service function forwarding node provided in the third aspect and the control node provided in the fourth aspect.

According to a sixth aspect, the present disclosure provides a service function forwarding node. The service function forwarding node includes a receiver, a transmitter, a memory, a processor, and a bus system. The receiver, the transmitter, the memory, and the processor are connected to each other using the bus system. The memory is configured to store an instruction. The processor is configured to execute the instruction stored in the memory, to control the receiver to receive a signal and to control the transmitter to send a signal, and when the processor executes the instruction stored in the memory, the execution enables the processor to perform the method according to the first aspect or any possible implementation of the first aspect.

According to a seventh aspect, the present disclosure provides a control node, where the control node includes a receiver, a transmitter, a memory, a processor, and a bus system. The receiver, the transmitter, the memory, and the processor are connected to each other using the bus system. The memory is configured to store an instruction. The processor is configured to execute the instruction stored in the memory to control the receiver to receive a signal and to control the transmitter to send a signal, and when the processor executes the instruction stored in the memory, the execution enables the processor to perform the method according to the second aspect or any possible implementation of the second aspect.

According to an eighth aspect, the present disclosure provides a computer readable medium configured to store a computer program, where the computer program includes an instruction used to perform the method according to the first aspect or any possible implementation of the first aspect.

According to a ninth aspect, the present disclosure provides a computer readable medium configured to store a computer program, where the computer program includes an instruction used to perform the method according to the second aspect or any possible implementation of the second aspect.

In some of the foregoing implementations, the packet forwarding rule includes a first mapping relationship between a match item of traffic characteristic information of a non-SFC packet and route prefix information, at least one channel is connected between the first service function forwarding node and a target node, the target node is determined by the control node, and the first service function forwarding node forwards the first packet to the target node based on the target next-hop information, and the extended community attribute field includes a mode (MOD) field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

The MOD field is added in the extended community attribute field to carry the traffic allocation policy such that a service function forwarding node can further control, based on the traffic allocation policy, the proportion of traffic allocated to each channel, and traffic allocation is more balanced and more appropriate in an entire SFC network.

In some of the foregoing implementations, the BGP Flow Spec NLRI field includes at least one type-length-value (TLV) field, and each TLV field carries one type of the match item of the traffic characteristic information of the SFC packet.

The NLRI field in the existing BGP protocol is extended to the newly add TLV field, to carry the match item of the traffic characteristic information of the SFC packet.

The present disclosure provides the SFC-based packet forwarding method, apparatus, and system, which can implement redirection of a packet forwarding path through automatic configuration that is performed by the control node on the service function forwarding node.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding and describing the communication method, apparatus, and system based on SFC provided in the embodiments of the present disclosure, first an application scenario of the embodiments of the present disclosure is described with reference to FIG. 1.

Figure 1:
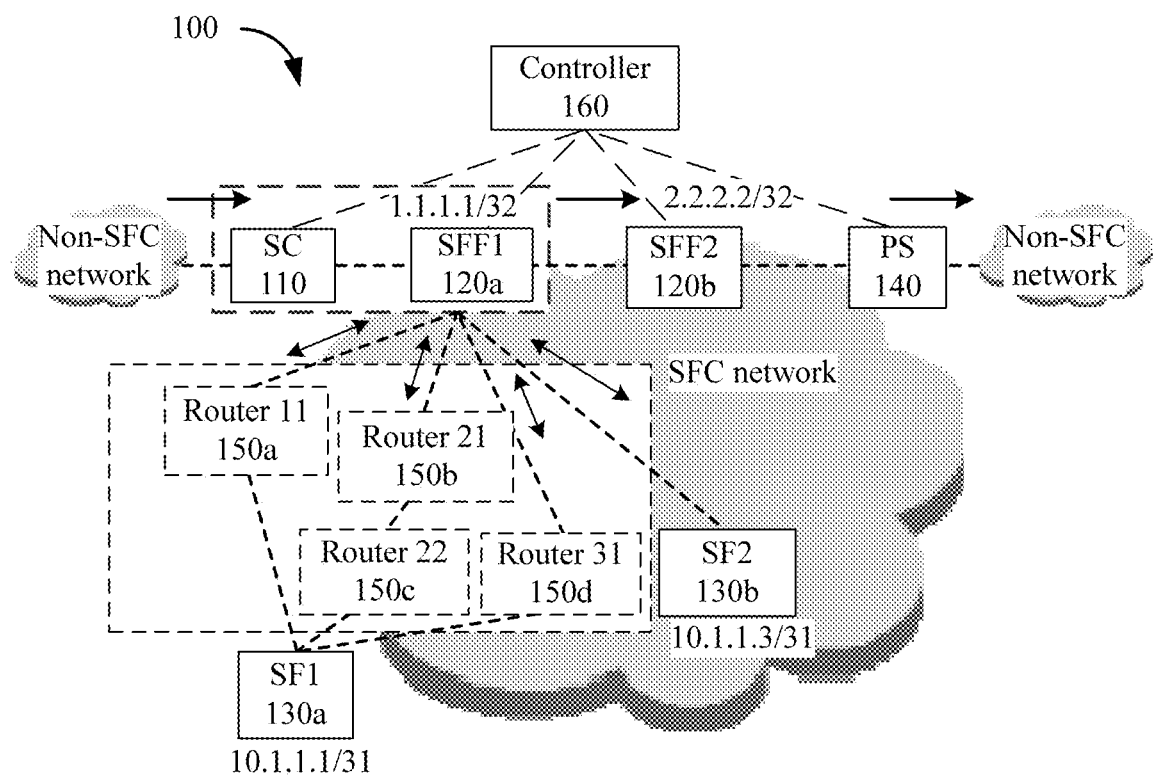
FIG. 1 is a schematic diagram of an application scenario according to an embodiment of the present disclosure.

FIG. 1 is a schematic diagram of an application scenario according to an embodiment of the present disclosure. As shown in FIG. 1, SFC 100 includes a service classifier node (or referred to as a service classifier (SC)) 110, service function forwarding nodes (or referred to as service function forwarders (SFF)), service function nodes (or referred to as service function (SF) processors), a post service (PS) node 140, and a control node (or referred to as a controller) 160. For example, the SFFs include an SFF1 120a and an SFF2 120b, and the SFs include an SF1 node 130a and an SF2 node 130b.

Herein, it needs to be noted that the SFC is a virtual overlay network of a basic underlying network (such as an underlying IP network), and the SFC includes some nodes (such as nodes having service processing and forwarding functions) of the basic underlying network. To be specific, nodes included in the SFC are not all physically directly connected. For example, a network element such as a router or a switch may be connected between the SFF nodes.

In addition to the foregoing listed service classifier node, service function forwarding nodes, service function nodes, and post service node, the SFC further includes various routing and switching devices in a physical network in which the SFC is located. All of the foregoing listed service classifier node, service function forwarding nodes, service function nodes, post service node, and routing and switching devices may be referred to as network nodes. For ease of differentiation, the service classifier node, the service function forwarding node, the service function node, and the post service node in the SFC are collectively referred to as SFC nodes. Various routing and switching devices in the physical network are configured to forward a packet from one SFC node to another SFC node. It should be understood that the foregoing listed SFC nodes are merely examples for description but shall not be construed as any limitation on the present disclosure, and the SFC nodes may further include other nodes configured to implement SFC functions in an SFC network. For brevity, details are not described herein again.

It should be further understood that the foregoing listed SFC nodes may be understood as function modules, which are respectively configured to perform corresponding functions. Each SFC node may be separately deployed, or a plurality of SFC nodes may be integrated and deployed, and a specific manner of deploying each SFC node is not particularly limited in the present disclosure. For example, the SC and the SFF1 may be integrated and deployed into a physical device, which has a traffic matching function of the SC and a service forwarding function of the SFF1, or has an SC module and an SFF module. In the following description, unless otherwise stated, it is considered that the SC is integrated and deployed with the SFF1. To be specific, the SFF1 integrated and deployed with the SC has both the traffic matching function and the service forwarding function.

As shown in FIG. 1, when a packet reaches the SFF1 120a, the SFF1 120a parses traffic characteristic information (for example, 5-tuple information) of traffic carried by the packet, filters the packet, and directs a packet matching a filtering condition (or referred to as a match item) of the traffic characteristic information to a corresponding SFP. As the first service function forwarding node that the packet enters, the SFF1 120a encapsulates the packet based on the matched SFP. An encapsulated packet includes an SFC header, where the SFC header includes an SPI that is used to indicate the SFP that matches the packet. Then the SFF1 forwards the encapsulated packet to a next SFC node. Further, the SFF1 120a forwards the encapsulated packet to the SF1 node 130a based on the SFP. After processing the packet, the SF1 node 130a returns the packet to the SFF1 120a. The SFF1 120a continues to forward, based on the SFP that matches the packet, the packet processed by the SF 130a to the SFF2 120b, and so on, until the packet is transmitted to the PS node 140 of the SFP that matches the packet.

During forwarding of a packet between the SFC nodes, for example, between a service function forwarding node and another service function forwarding node, or between a service function forwarding node and a service function node, the packet may be forwarded using a plurality of routing and switching devices, or a plurality of channels may be simultaneously reachable between a service function forwarding node and another service function forwarding node, or between a service function forwarding node and a service function node, and the plurality of channels include different routing and switching devices.

Referring to FIG. 1 again, a packet may reach the SF1 130a from the SFF1 120a using a routing and switching device (for example, a router 11 150a), or may reach the SF1 130a from the SFF1 120a using a router 21 150b and a router 22 150c, or may reach the SF1 130a from the SFF1 120a using a router 31 150d. The packet may reach the SF1 130a from the SFF1 120a using three channels.

In this embodiment of the present disclosure, for ease of differentiation and understanding, a link for connecting a service function forwarding node to another service function forwarding node is referred to as an SFP, and a link, including routing and switching devices, for connection between a service function forwarding node and another service function forwarding node, or between a service function forwarding node and a service function node is referred to as a channel. It may be understood that one SFP may correspond to a plurality of channels, and this is not particularly limited in the present disclosure. For example, SFF1 120a→router 11 150a→SF1 130a, SFF1 120a→router 21 150b→router 22 150c→SF1 130a, and SFF1 120a→router 31 150d→SF1 130a shown in FIG. 1 may be considered as three different channels that correspond to a same SFP. It should be understood that, a connection relationship between an SFP and a channel shown in FIG. 1 is merely an example for description but shall not be construed as any limitation on the present disclosure. A connection relationship between each SFC node and a routing and switching device is not limited to the connection relationship shown in FIG. 1, and the connection relationship between each SFC node and a routing and switching device is not particularly limited in the present disclosure.

In an actual forwarding process, a service function forwarding node may direct, using next-hop information corresponding to route prefix information, a packet to a next node. For example, a next-hop node of the SFF1 120a shown in FIG. 1 may be the router 11 150a, or may be the router 21 150b, or may be the router 31 150d. The packet is forwarded from the SFF1 120a to any next-hop node among the router 11 150a, router 21 150b, and router 31 150d, or a target node (or referred to as a next SFC node) that the packet finally reaches after passing any one of the foregoing three channels is the SF1 130a.

It should be understood that, in the SFC, each service function forwarding node may be connected to at least one SFC node using different routing and forwarding devices, and the at least one SFC node may be a service function node or a service function forwarding node. Each service function forwarding node may be simultaneously located in at least one SFP. When a packet reaches the first service function forwarding node of an SFP, the packet needs to be forwarded based on a forwarding entry corresponding to the SFP.

It can be learned, from the foregoing description, that an SFC node transmits a packet based on an SFP, or transmits a packet based on an SFC forwarding table, where the SFC forwarding table is determined based on network topology information of the SFC. Therefore, before a packet is forwarded, the control node (or referred to as the controller) needs to preconfigure a plurality of SFPs in the SFC based on related information of the nodes such as the SC, the SFF, the SF, and the PS in the SFC, to match a requirement for forwarding of different packets. In addition, each time after a new SFP is created, the control node delivers the new SFP to each service function forwarding node and each routing and switching device in the SFP such that each service function forwarding node and each routing and switching device can synchronize forwarding entries with the control node.

It should be understood that, the SFC may be understood as a virtual network superimposed on a physical network. In the SFC, the first service function forwarding node (or referred to as an ingress node or a head node) stores a non-SFC forwarding table and an SFC forwarding table, which respectively correspond to two forwarding planes, namely, a non-SFC forwarding plane (for example, an IP, including IP version 4 (IPv4) and IP version 6 (IPv6)) forwarding plane or a Multiprotocol Label Switching (MPLS) forwarding plane) and an SFC forwarding plane. In addition, in the SFC forwarding plane, the node may be connected to a plurality of SFPs. Therefore, when a packet enters the first service function forwarding node of the SFC, the packet needs to be directed, otherwise, the packet may be forwarded to the non-SFC forwarding plane or an incorrect SFP, and consequently, expected service function processing cannot be performed on the packet.

For example, when the packet enters the SFC forwarding plane from the non-SFC forwarding plane, the packet first enters the first service function forwarding node (such as the SFF1 in FIG. 1) of the SFC. If the first service function node that the packet needs to enter is the SF2 shown in FIG. 1, the packet needs to be directed, to avoid that the packet enters the non-SFC forwarding plane, or avoid that the first node that the packet enters is the SF1 or the SFF2 but not the SF2 that matches traffic carried by the packet, even if the packet enters the SFC forwarding plane.

Furthermore, when the packet in the SFC forwarding plane reaches the last service function forwarding node (or referred to as an egress node or a tail node) of an SFP (denoted as an SFP #1 for ease of differentiation and description), and the packet needs to be forwarded to another SFP (denoted as an SFP #2 for ease of differentiation and description), the packet also needs to be directed, to prevent the packet from leaving the SFC forwarding plane and from entering the non-SFC forwarding plane, or from entering an SFP that does not match the traffic even if the packet does not leave the SFC forwarding plane.

In the other approaches, usually static configuration is performed on the first service function forwarding node of the SFC based on a specific network topology and traffic characteristic information such that the service function forwarding node forwards the packet based on an expected path. For example, for each packet entering the SFC, a command line is manually entered on the ingress node of the SFC such that the packet enters the SFC forwarding plane according to configuration of the command line. However, a manual configuration method requires professional technical personnel to spend a large amount of time in completing the configuration, with a heavy workload and complex maintenance. For example, when the network topology changes, a node needs to be manually deleted or added. In addition, a configuration error may easily occur when a configuration workload is relatively heavy.

Therefore, the present disclosure provides an SFC-based packet forwarding method, which can implement redirection of a packet forwarding path through automatic configuration that is performed by a control node on a forwarding node.

For ease of understanding, before the embodiments of the present disclosure are described, first a brief description is given to a specific process of synchronizing forwarding entry information between the control node and a service function forwarding node and performing packet forwarding based on the forwarding entry information.

In an implementation, the control node and the service function forwarding node synchronize route entry information, and the service function forwarding node performs calculation to generate a forwarding table. In another implementation, the control node and the service function forwarding node synchronize the forwarding entry information using a BGP packet.

In a first implementation, first the control node may preconfigure at least one SFP based on a distribution status of the network nodes in the SFC to match packets of different traffic.

Then the control node determines route entry information of each service function forwarding node in each SFP, and sends the route entry information to a corresponding service function forwarding node.

The control node may directly send the route entry information to the service function forwarding node, and the service function forwarding node stores the received route entry information into a local routing table. When receiving a packet, the service function forwarding node computes an optimal path based on the route entry information in the routing table, generates a forwarding table (such as a forwarding information base (FIB) table), and forwards the packet based on the forwarding table.

Optionally, the control node may use the BGP packet to carry the route entry information. Further, the BGP packet includes a multiprotocol reachable NLRI (MP_REACH_NLRI) attribute field that is encapsulated in an encapsulation format supported by a BGP SFC synchronization address family. The MP_REACH_NLRI attribute field carries the route entry information. Further, the MP_REACH_NLRI attribute field carries three parts, an address family information field, a next-hop information field, and a NLRI field.

The address family information field may include an address family identifier (also referred to as AFI) field and a subsequent address family identifier (also referred to as SAFI) field. An address family identifier identifies a network layer protocol, and a subsequent address family identifier identifies a type of a subsequent address family. The foregoing listed BGP SFC Synchronization address family may be understood as a subsequent address family extended from an IPv4 or IPv6 address family in the existing BGP, and a value of a SAFI corresponding to the BGP SFC Synchronization address family may be determined according to a standard formulated by the international Internet Engineering Task Force IETF).

The next-hop information field may include a next-hop address length field and a next-hop address field. The next-hop address length field is used to identify a length of the next-hop address field, and the length of the next-hop address field is determined by the length that is identified by the next-hop address length field. Next-hop information in the next-hop address field is used to indicate an address of a next-hop node.

The NLRI field may include an NLRI field. The NLRI field may further include a TLV field, where a type T field indicates that a type of the TLV field is an SFC route entry synchronization type, a length L field indicates a length of a V field, and the value V field carries a SPI and an SI.

Further, the route entry information further includes route attribute information, and the route attribute information includes at least one of the following traffic allocation parameter types, weight, cost, and bandwidth. The route attribute information may be carried in a BGP SFC Attribute field of the BGP packet. The BGP SFC Attribute field includes at least one sub-TLV field, and each traffic allocation parameter type corresponds to one sub-TLV field in the at least one sub-TLV field.

When receiving the route entry information, the service function forwarding node determines an optimal path based on the route attribute information carried in the route entry information, and generates a forwarding table. Therefore, the service function forwarding node can allocate traffic more appropriately and more flexibly based on a traffic allocation parameter.

In a second implementation, first the control node may preconfigure at least one SFP based on a distribution status of the network nodes in the SFC to match packets of different traffic.

Then the control node determines forwarding entry information of each service function forwarding node in each SFP, uses a BGP packet to carry the forwarding entry information, and sends the forwarding entry information to a corresponding service function forwarding node.

Further, the BGP packet includes a MP_REACH_NLRI attribute field that is encapsulated in an encapsulation format supported by a BGP SFC synchronization address family. The MP_REACH_NLRI attribute field carries the forwarding entry information. Further, the MP_REACH_NLRI attribute field carries three parts, an address family information field, a next-hop information field, and an NLRI field.

It should be understood that a specific method for carrying the forwarding entry information by the BGP packet is similar to a specific method, described in the foregoing first implementation, for carrying the route entry information by the BGP packet. For brevity, details are not described herein again.

In this way, the control node and the service function forwarding node complete synchronization of the route entry information or the forwarding entry information, and the service function forwarding node may forward a packet based on the forwarding table and the preconfigured SFP.

It needs to be noted that, in the specific method described above for synchronizing the forwarding entry information, the control node may deliver the route entry information to the service function forwarding node such that the service function forwarding node generates a forwarding table based on a locally stored routing table, or the control node may deliver the forwarding entry information to the service function forwarding node. Both the route entry information and the forwarding entry information can be used by the service function forwarding node to perform packet forwarding. In the following description, unless otherwise stated, the route entry information and the forwarding entry information are collectively referred to as forwarding entry information.

It should be understood that, the foregoing listed specific methods for carrying the forwarding entry information in fields of the BGP packet are merely examples for description but shall not be construed as any limitation on the present disclosure, and the present disclosure shall not be limited hereto, either. For example, the forwarding entry information may be carried in another existing field or a new field in a BGP packet, or carried using a flow table of OPENFLOW, and this is not particularly limited in the present disclosure.

It needs to be noted that, each service function forwarding node in each SFP may correspond to at least one piece of forwarding entry information. One piece of forwarding entry information may be used to instruct the service function forwarding node to forward a packet on one SFP. The forwarding table includes at least one piece of forwarding entry information, and the at least one piece of forwarding entry information may be one or more pieces of forwarding entry information of one SFP, or may be forwarding entry information of a plurality of SFPs.

The foregoing briefly describes a process of synchronizing, in two manners, forwarding entry information between the control node and the service function forwarding node. It should be understood that, in this embodiment of the present disclosure, the service function forwarding node may synchronize the forwarding entry information with the control node using the foregoing methods, or synchronize the forwarding entry information using another method, and this is not particularly limited in the present disclosure. In this application, the foregoing two synchronization manners are listed as examples, and merely intended to help understand the SFC-based packet forwarding method in this embodiment of the present disclosure but shall not be construed as any limitation on the present disclosure.

For ease of understanding and description, the following describes, in detail with reference to FIG. 1 and Table 1, a specific process in which the service function forwarding node forwards a packet based on the forwarding entry information.

It is assumed that a packet (denoted as a packet A for ease of description) entering the SFC is directed to a first SFP, namely, SC→SFF1→SF1→SFF1→SF2→SFF1→SFF2→PS shown in FIG. 1. The SC and the SFF1 may be integrated and deployed as the SFF1, and the PS and the SFF2 may be integrated and deployed as SFF2. For ease of description, the following skips describing the SC and the PS.

For example, a SPI corresponding to the first SFP may be 10, and an SI of the ingress node (namely, the SFF1) may be 255. Route prefix information of the SFF1 may be SPI=10 and SI=255. In this case, route entry information of the SFF1 in the first SFP may be shown in Table 1.

TABLE 1

| SPI | SI | Next-hop information |
|-----|-----|---------------------|
| 10 | 255 | 10.1.1.1/31 |
| 10 | 254 | 10.1.1.3/31 |
| 10 | 253 | 2.2.2.2/32 |

It can be learned from FIG. 1 and Table 1 that, in the first SFP, after a first packet enters the SFF1, next-hop information to which the route prefix information SPI=10 and SI=255 points is 10.1.1.1/31, namely, the SF1, and the first packet is forwarded by the SFF1 to the SF1. After the SF1 performs service function processing, the first packet returns to the SFF1 and the SI is decremented by 1. In this case, the route prefix information of the SFF1 is SPI=10 and SI=254, and next-hop information is 10.1.1.3/31, namely, the SF2, and the first packet is forwarded by the SFF1 to the SF2. After the SF2 performs service function processing, the first packet returns again to the SFF1 and the SI is decremented by 1. In this case, the route prefix information of the SFF1 is SPI=10 and SI=253, and next-hop information is 2.2.2.2/32, namely, the SFF2. In this way, the first packet is forwarded by the SFF1 to a next service function forwarding node, which is the SFF2.

It needs to be noted that, the route prefix information of the SFF1 listed in Table 1 and the corresponding next-hop information indicate a connection relationship between SFC nodes, and are forwarding entry information shown as an example using an SFC node as a control granularity, but shall not be construed as any limitation on the present disclosure. Using FIG. 1 as an example, in an actual first packet forwarding process, the next-hop information corresponding to the route prefix information SPI=10 and SI=255 of the SFF1 may be an address of the router 11, or may be an address of the router 21, or may be an address of the router 31. The route prefix information SPI=10 and SI=255 of the SFF1 may correspond to three entries, and each entry includes a correspondence between the route prefix information and an address of a routing and switching device (for example, the router 11, the router 21, or the router 31 shown in FIG. 1). After the first packet is directed to the router 11, the router 21, or the router 31, the first packet may continue to be forwarded based on route entry information of the router 11, the router 21, or the router 31, until the first packet is forwarded to the SF1.

Herein, for ease of description only, an address of the SF1 is denoted as the next-hop information corresponding to the route prefix information SPI=10 and SI=255 of the SFF1, but shall not be construed as any limitation on the present disclosure. Similarly, an address of the SF2 is denoted as next-hop information corresponding to the route prefix information SPI=10 and SI=254 of the SFF1, and an address of the SFF2 is denoted as next-hop information corresponding to the route prefix information SPI=10 and SI=253 of the SFF1.

In this embodiment of the present disclosure, the SFF1 in the first SFP corresponds to three pieces of route prefix information, and the three pieces of route prefix information have a same SPI (that is, correspond to a same SFP) but different SIs, because a location of the SSF1 in the first SFP varies each time the first packet passes the SFF1. Next-hop information corresponding to each piece of route prefix information also varies. A next-hop node to which the packet is directed based on each piece of route prefix information also varies. Mapping relationships between the three pieces of route prefix information and three pieces of next-hop information form forwarding entry information of the SFF1 in the first SFP.

After determining the first SFP, the control node may send the forwarding entry information of the SFF1 to the SFF1 such that the SFF1 forwards a packet based on the forwarding entry information.

It should be understood that, the forwarding entry information shown in Table 1 is merely an example for description but shall not be construed as any limitation on the present disclosure. Forwarding entry information delivered by the control node to a service function forwarding node includes the SPI, SI, and next-hop information described in Table 1, but Table 1 is not necessarily an expression form of the forwarding entry information. The forwarding entry information may be delivered to a service function forwarding node using Table 1 or in another form different from Table 1.

It should be further understood that, the first SFP shown in FIG. 1 is merely an example for description but shall not be construed as any limitation on the present disclosure. For example, no service function node may be connected to the SFF1, or a service function node may be connected to the SSF2, or another service function forwarding node may be connected to the SFF2, and this is not particularly limited in the present disclosure. When a service function node or a service function forwarding node is connected to the SFF2, the control node may also send forwarding entry information of the SFF2 to the SFF2 such that the SFF2 forwards a packet based on the forwarding entry information.

It should be further understood that, the control node may further determine a second SFP in the SFC, and the second SFP may also include the foregoing service function forwarding nodes. Therefore, after determining the second SFP, the control node may also send corresponding forwarding entry information to each node (including the foregoing service function forwarding nodes) in the second SFP.

It should be further understood that, the foregoing describes in detail the forwarding entry information with reference to the first packet forwarding process, but shall not be construed as any limitation on the forwarding entry information. The service function forwarding node may forward a packet based on forwarding entry information of the first SFP, or forward a packet based on forwarding entry information of the second SFP. Forwarding entry information corresponding to each SFP does not change with a path that the packet actually passes. On the contrary, the ingress node may select a matched SFP based on attribute information of the packet.

The foregoing describes in detail the specific process in which the service function forwarding node forwards a packet based on the forwarding entry information. The following describes, in detail with reference to FIG. 2 and FIG. 3, an SFC-based packet forwarding method according to an embodiment of the present disclosure.

It needs to be noted that, in the following listed SFC-based packet forwarding method, a first service function forwarding node may be understood as a node in which a classifier node and a service function forwarding node are integrated and deployed. The first service function forwarding node has both a traffic matching function and a packet forwarding function. It should be understood that, the first service function forwarding node listed in this embodiment of the present disclosure may be understood as a logical node, and it may be performed by one physical device or corresponding functions may be performed by a plurality of physical devices in a sharing manner. When the functions of the first service function forwarding node are performed by one physical device, the physical device may have both the traffic matching function and the packet forwarding function, or when the functions of the first service function forwarding node are performed by a plurality of physical devices (for example, two physical devices), one physical device may perform the traffic matching function and another physical device may perform the traffic forwarding function, and this is not particularly limited in the present disclosure.

Figure 2:
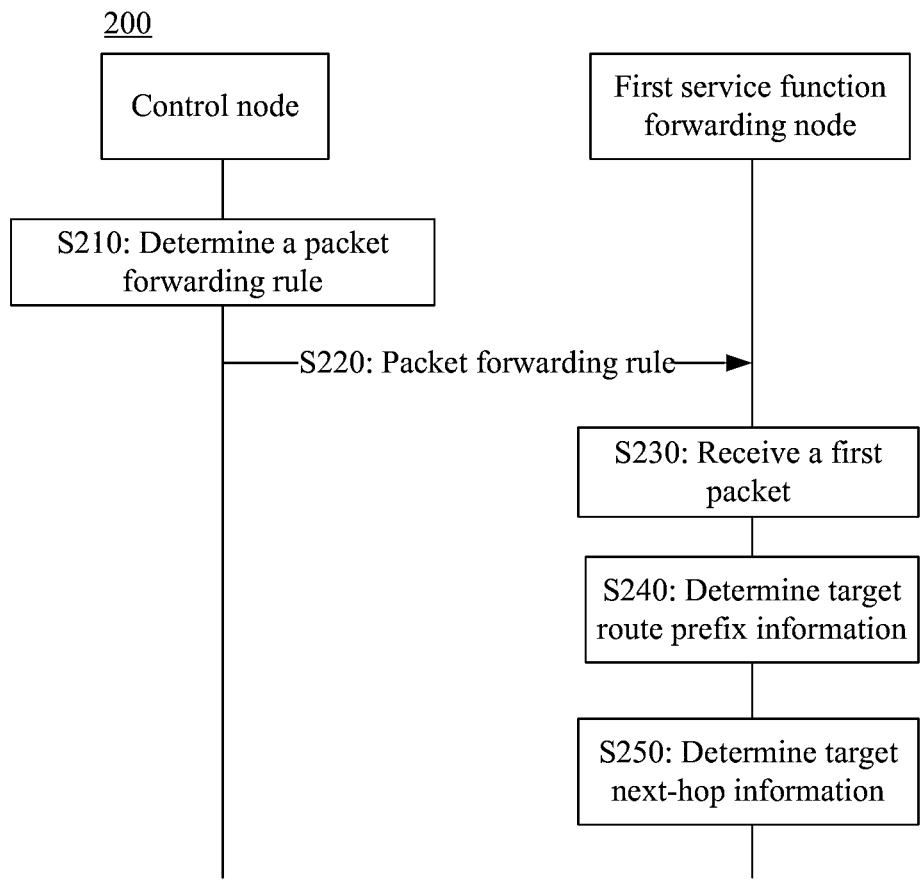
FIG. 2 is a schematic flowchart of an SFC-based packet forwarding method according to an embodiment of the present disclosure.

FIG. 2 is a schematic flowchart of an SFC-based packet forwarding method 200 according to an embodiment of the present disclosure. It should be understood that, FIG. 2 shows detailed communication steps or operations of the SFC-based packet forwarding method, but these steps or operations are merely examples, and other operations or variations of the operations in FIG. 2 may also be performed in this embodiment of the present disclosure. In addition, the steps in FIG. 2 may be performed in an order different from that presented in FIG. 2, and it is possible that not all the operations in FIG. 2 need to be performed.

As shown in FIG. 2, the packet forwarding method 200 includes the following steps.

Step S210. A control node determines a packet forwarding rule, where the packet forwarding rule is used to indicate a mapping relationship between a match item of traffic characteristic information of a packet and route prefix information.

Further, in SFC, the control node may collect traffic information using a traffic collector, and analyze the traffic information using a traffic analyzer. When it is found that traffic on a path is relatively heavy, a control requirement may be sent to the control node, to control the traffic on the path, for example, to direct a part of the traffic to another path. Alternatively, when a user arranges particular service processing for a service and traffic needs to be directed so that the traffic enters a specified service function node, a control requirement may be sent to the control node, to control the traffic using a controller.

For example, the traffic analyzer automatically generates, based on a traffic analysis result, a series of SFC forwarding rule entries, for example:

| Traffic characteristic | Action |
|---|---|
| A1 | Enter an SFP1: SPI 0 and SI 254 |
| A2 | Enter an SFP2: SPI 1 and SI 254 |
| . . . | |
| An | Enter an SFPn: SPI n and SI m |

The traffic analyzer forwards the automatically generated SFC forwarding rule entries to the control node. The traffic analyzer may be a device separated from the control node, or may be a function module integrated with the control node.

The control node receives the SFC traffic forwarding rule entries, and stores the entries into a packet forwarding rule table on the controller. The entries are newly added to the packet forwarding rule on the control node. The control node sends the newly added entries in the packet forwarding rule table to a first service function forwarding node.

For another example, a traffic characteristic is B1, and an SFP to enter is an SFPx, a SPI is y, and an SI is z. In this case, the user may manually add an SFC traffic forwarding rule entry on the control node

| Traffic characteristic | Action |
|---|---|
| A1 | Enter an SFP1: SPI 0, and SI 254 |
| A2 | Enter an SFP2: SPI 1 and SI 254 |
| . . . | |
| An | Enter an SFPn: SPI n and SI m |
| B1 | Enter an SFPx: SPI y and SI z |

The control node delivers the newly added SFC traffic forwarding rule entry in the packet forwarding rule to the first service function forwarding node, to implement the user's objective of directing the traffic. It needs to be noted that, the foregoing listed traffic collector and traffic analyzer each may be understood as a module configured to perform a corresponding function, and may be integrated with the control node into a same physical device, or may be separately deployed, and this is not particularly limited in the present disclosure.

In this embodiment of the present disclosure, a packet (denoted as a first packet for ease of description) entering the SFC may be a non-SFC packet, or may be an SFC packet. When the first packet is a non-SFC packet and the first packet needs to be directed to an SFC forwarding plane, traffic matching needs to be performed for the first packet, to match an SFP (denoted as a first SFP for ease of differentiation and description) for the first packet and direct the first packet to the first SFP (Case 1). When the first packet is an SFC packet and the first packet needs to be forwarded from one SFP (denoted as a second SFP for ease of differentiation and description) to another SFP (denoted as a third SFP for ease of differentiation and description), the first packet also needs to be directed (Case 2). The SFC-based packet forwarding method in this embodiment of the present disclosure is subsequently described in detail separately with reference to Case 1 and Case 2.

In this embodiment of the present disclosure, the control node may determine mapping relationships between a plurality of match items and a plurality of pieces of route prefix information according to a control command. The match item herein is a match item of traffic characteristic information of a packet. For ease of description, unless otherwise stated in the subsequent description, a match item of traffic characteristic information of a packet is referred to as a match item.

Further, the match item may vary according to different packet types. For example, for a non-SFC packet, the match item may be 5-tuple information, and for an SFC packet, the match item may be a SPI, or a SPI and an SI.

It can be learned from the foregoing description that, the control node stores a routing table, and synchronizes the routing table in a form of a routing table or a forwarding table to each service function forwarding node. The routing table includes route entry information of each service function forwarding node in the SFC. The route entry information includes a mapping relationship between route prefix information and next-hop information. The route prefix information may include a SPI and an SI. For a packet (for example, the first packet) whose header carries a SPI and an SI, the SPI indicates an SFP in which the first packet resides, and the SI indicates a location, of a service function forwarding node on which the first packet resides, in the SFP.

In this embodiment of the present disclosure, the control node may determine a mapping relationship between a match item of traffic characteristic information of a packet and route prefix information according to a control requirement and the routing table that is synchronized to each service function forwarding node. In addition, the control node may also establish a mapping relationship between a match item of a traffic characteristic information of a packet and next-hop information based on the mapping relationship, stored in the routing table, between route prefix information and next-hop information. That is, by determining the packet forwarding rule, the control node may determine, based on the traffic characteristic information of the packet, a service function forwarding node or a service function node to which the packet is to be directed. The control node determines the packet forwarding rule based on a locally stored routing table, or based on a currently configured SFP. If the control node determines that a path along which the packet needs to be directed from a node (denoted as a node A for ease of differentiation and description) to another node (denoted as a node B for ease of differentiation and description) is not a preconfigured SFP, the control node may create an SFP based on a newly determined connection relationship between the node A and the node B, and deliver forwarding entry information of the newly-created SFP to corresponding service function forwarding nodes (for example, including the node A and the node B), to complete forwarding entry information synchronization.

It needs to be noted that, in this embodiment of the present disclosure, the control node may dynamically adjust the packet forwarding rule according to a control command. For example, in a first time period, a packet that meets a match item A may be directed to an SFP #1 according to a requirement, and in a second time period, a packet that meets the match item A may be directed to an SFP #2 according to a requirement. For another example, when a service function node or service function forwarding node in the SFC is deleted, a mapping relationship associated with the service function node or service function forwarding node may be deleted. A mapping relationship in the packet forwarding rule can be deleted, modified, or added based on a network change, to implement dynamic adjustment, with very high flexibility.

"Associated" herein may be understood as follows In the mapping relationships between a plurality of match items and a plurality of pieces of route prefix information, a piece of route prefix information exactly corresponds to a deleted service function forwarding node, or next-hop information corresponding to a piece of route prefix information exactly points to a deleted or newly-added service function node or service function forwarding node. In this case, the mapping relationship needs to be modified or deleted. In this case, it may be considered that the service function forwarding node corresponding to the route prefix information is associated with a mapping relationship between the route prefix information and a match item.

Further, when a service function forwarding node is deleted, an associated mapping relationship needs to be deleted and a new mapping relationship needs to be established, when a service function node or service function forwarding node to which next-hop information corresponding to a piece of route prefix information (denoted as route prefix information A for ease of differentiation and understanding) points is deleted, corresponding route prefix information (denoted as route prefix information B for ease of differentiation and understanding) needs to be determined based on a new or another address (which is used as the next-hop information) used to replace the service function node or service function forwarding node, and a mapping relationship between a match item and the route prefix information A is changed to a mapping relationship between the match item and the route prefix information B.

It should be understood that, the foregoing listed specific manner of dynamically adjusting a mapping relationship between a match item and route prefix information is merely an example for description, but shall not be construed as any limitation on the present disclosure, and a specific method for dynamically adjusting a mapping relationship between a match item and route prefix information is not particularly limited in the present disclosure.

Step S220. The control node sends the packet forwarding rule to a first service function forwarding node.

Further, after updating or adding a mapping relationship between a match item and route prefix information, the control node may deliver the updated or newly-added mapping relationship to a service function forwarding node associated with the mapping relationship. Herein, for ease of description, the service function forwarding node is denoted as the first service function forwarding node. It should be understood that, the first service function forwarding node, as an example of the service function forwarding node, is merely an example for description, but shall not be construed as any limitation on the present disclosure, and "first" is merely used to identify the service function forwarding node, but shall not be construed as any limitation on an SFP in which the service function forwarding node resides or any limitation on a location of the service function forwarding node.

It can be learned from the foregoing description that, the control node delivers the forwarding entry information in advance to each service function forwarding node, and therefore the first service function forwarding node stores a forwarding table of the first service function forwarding node, the forwarding table stores a correspondence between at least one piece of route prefix information corresponding to the first service function forwarding node and at least one piece of next-hop information, and each piece of next-hop information indicates an address of a next-hop node. The specific process in which the first service function forwarding node forwards a packet based on the correspondence between the at least one piece of route prefix information and the at least one piece of next-hop information is described above. For brevity, details are not described herein again.

Step S230. The first service function forwarding node receives a first packet, where a header of the first packet carries traffic characteristic information of the first packet.

Further, when receiving the first packet, the first service function forwarding node may read the traffic characteristic information carried in the header of the first packet. When the first packet is a non-SFC packet (for example, a common IP packet), the traffic characteristic information may be, for example, 5-tuple information, or when the first packet is an SFC packet, the traffic characteristic information may include a SPI and an SI, and the traffic characteristic information of the first packet may further include traffic characteristic information similar to a non-SFC packet. When the first service function forwarding node receives the first packet, if either of the SPI and the SI is read from the header, it may be considered that the first packet is an SFC packet, or if neither the SPI nor SI is read, it may be considered that the first packet is a non-SFC packet.

It should be understood that, the method described herein for determining, based on whether the header carries the SPI or the SI, whether the first packet is an SFC packet is merely an example for description, but shall not be construed as any limitation on the present disclosure, and the first service function forwarding node may alternatively use another method to determine whether the first packet is an SFC packet.

Step S240. The first service function forwarding node determines, according to the packet forwarding rule, target route prefix information corresponding to the traffic characteristic information of the first packet.

Further, according to the packet forwarding rule, the first service function forwarding node forwards a non-SFC packet to the first SFP in the SFC, or may direct an SFC packet from the second SFP to the third SFP. The following describes, in detail with reference to the foregoing two cases, the determining, by the first service function forwarding node, the target route prefix information according to the packet forwarding rule.

Step S250. The first service function forwarding node determines target next-hop information based on the target route prefix information, and forwards the first packet based on the target next-hop information.

It can be learned from the foregoing description that, the first service function forwarding node may determine, based on a locally stored forwarding table, the target next-hop information corresponding to the target route prefix information. A detailed description of a specific method for determining, by the first service function forwarding node, the target next-hop information based on the target route prefix information is omitted herein. After the target next-hop information is determined, an address of a next-hop node may be determined, to direct the first packet to the next-hop node.

It needs to be noted that, in this embodiment of the present disclosure, a method for sending, by the control node, a packet forwarding rule to a service function forwarding node (for example, the first service function forwarding node) may be understood as a method for synchronizing the packet forwarding rule between the control node and the service function forwarding node. The control node may store a determined packet forwarding node into a local packet forwarding rule library (denoted as a rule library 1 for ease of differentiation and understanding), and the service function forwarding node may also store a received packet forwarding rule in a locally stored packet forwarding rule library (denoted as a rule library 2 for ease of differentiation and understanding). It should be understood that, the rule library 1 stores a packet forwarding rule corresponding to each service function forwarding node (for example, including the first service function forwarding node) in the SFC, and the rule library 2 stores a packet forwarding rule associated with itself. The rule library 2 may be understood as a subset of the rule library 1. When a packet forwarding rule in the rule library 1 is updated, the updated packet forwarding rule is synchronized to the rule library 2 such that the service function forwarding node adjusts the packet forwarding rule in time, and a packet forwarding path is adjusted in real time based on a network status, with very high flexibility.

Therefore, according to the SFC-based packet forwarding method in this embodiment of the present disclosure, the control node and the service function forwarding node synchronize the packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the SFC-based packet forwarding method are more outstanding convenience, time saving, and labor saving. In addition, automatic configuration performed using a machine also reduces an error rate of manual configuration. Furthermore, because dynamic adjustment can be performed based on a status of network traffic, flexibility is very high.

The foregoing describes, in detail with reference to FIG. 2, a specific process of the SFC-based packet forwarding method in this embodiment of the present disclosure. The following describes in detail a specific process of the SFC-based packet forwarding method in Case 1 and a specific process of the SFC-based packet forwarding method in Case 2.

Case 1

Case 1 may correspond to the scenario shown in FIG. 1. In an embodiment, when the first packet is a non-SFC packet and the first packet needs to be directed to the SFC forwarding plane, traffic matching needs to be performed for the first packet, to match an SFP for the first packet. For example, as shown in FIG. 1, when the first packet enters the first function forwarding node SFF1 in the SFC, the first packet needs to be directed, to match an SFP for the first packet. In addition, the first packet is encapsulated based on a SPI of the matched SFP, where a header of the encapsulated first packet includes the SPI used to indicate the matched SFP. In this case, the packet forwarding rule may include a first mapping relationship between traffic characteristic information of a non-SFC packet and route prefix information.

Optionally, the sending, by the control node, the packet forwarding rule to a first service function forwarding node in S220 includes receiving, by the first service function forwarding node, a BGP Flow Spec packet sent by the control node, where the BGP Flow Spec packet includes a Flow Spec NLRI field and an extended community attribute field, the Flow Spec NLRI field carries the match item of the traffic characteristic information of the non-SFC packet, the extended community attribute field includes a SPI field and an SI field, the SPI field carries the SPI, and the SI field carries the SI.

Further, the BGP Flow Spec packet includes an MP_REACH_NLRI attribute field, and this attribute field includes an NLRI field (namely, the Flow Spec NLRI field). In this embodiment of the present disclosure, the NLRI field carries the match item, and the extended community attribute field carries the route prefix information.

Further, for a non-SFC packet, the match item may include at least one of the following items a destination address, a source address, an IP protocol number, a port number, a destination port number, a source port number, an Internet Control Message Protocol (ICMP) type, an ICMP code, a Transmission Control Protocol (TCP) flag, a differentiated services code point (DSCP), and a fragment type. The match item may be encapsulated in the NLRI field of the BGP Flow Spec packet. Table 2 shows twelve types of traffic match items in RFC 5575.

TABLE 2

| | |
|---|---|
| Type 1 - Destination Prefix | Destination address prefix |
| Type 2 - Source Prefix | Source address prefix |
| Type 3 - IP Protocol | IP protocol |
| Type 4 - Port | Port |
| Type 5 - Destination port | Destination port |
| Type 6 - Source port | Source port |
| Type 7 - ICMP type | ICMP type |
| Type 8 - ICMP code | ICMP code |
| Type 9 - TCP flags | TCP flag |

TABLE 2-continued

| | |
|---|---|
| Type 10 - Packet length | Packet length |
| Type 11 - DSCP | Differentiated services code point |
| Type 12 - Fragment | Fragment |

Figure 3:
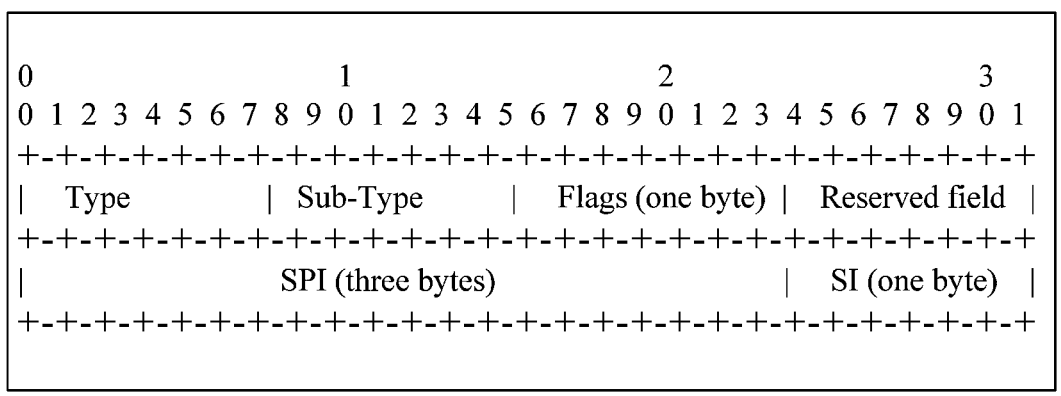
FIG. 3 is a schematic diagram of an extended community attribute field in a BGP Flow Spec packet according to an embodiment of the present disclosure.

Route prefix information corresponding to the match item may be carried in a newly-added extended community attribute field in the BGP Flow Spec packet. A format of the extended community attribute field is shown in FIG. 3. FIG. 3 is a schematic diagram of an extended community attribute field in a BGP Flow Spec packet according to an embodiment of the present disclosure. As shown in FIG. 3, the extended community attribute field includes a Type field, a Sub-Type field, a Flags field, an SPI field, an SI field, and a reserved field. A node associated with a SPI and an SI to which a packet is redirected (Redirect to SPI & SI Action) may be determined using the foregoing listed fields.

Further, the Type field and the Sub-Type field may be determined based on a standard formulated by the IETF. The SPI field (three bytes) carries the SPI, and the SI field (one byte) carries the SI.

In this embodiment of the present disclosure, when receiving the BGP Flow Spec packet, the first service function forwarding node may determine corresponding route prefix information based on the traffic characteristic information of the packet, and further determine a next-hop node based on a locally stored routing table.

It needs to be noted that, the mapping relationships (namely, packet forwarding rules), determined by the control node, between a plurality of match items and a plurality of pieces of route prefix information may be carried using a plurality of BGP Flow Spec packets, with each BGP Flow Spec packet carrying a mapping relationship between a match item and route prefix information.

Optionally, the packet forwarding rule includes a first mapping relationship between a match item of traffic characteristic information of a non-SFC packet and route prefix information, and the target route prefix information includes a target SPI and a target SI, and determining, by the first service function forwarding node according to the packet forwarding rule, target route prefix information corresponding to the traffic characteristic information of the first packet in step S240 includes, when the header of the first packet does not carry an SFC packet identifier, determining, by the first service function forwarding node, that the first packet is a non-SFC packet, and determining, by the first service function forwarding node, the target SPI and the target SI based on the first mapping relationship and the traffic characteristic information of the first packet.

Further, when receiving the first packet, the first service function forwarding node parses whether the header carries the SFC packet identifier. By way of example but not limitation, the SFC packet identifier may be a SPI or an SI. For example, when the header carries a SPI or SI, it is determined that the first packet is an SFC packet, or when the header does not carry a SPI or an SI, it is determined that the first packet is a non-SFC packet. It should be understood that, specific content of the SFC packet identifier listed herein is merely an example for description, but shall not be construed as any limitation on the present disclosure. The present disclosure does not exclude a possibility that another identifier is used as the SFC packet identifier.

After determining that the first packet is a non-SFC packet, the first service function forwarding node may determine, based on the first mapping relationship table, a target SPI and a target SI that match the traffic characteristic information of the first packet, and further query the locally stored forwarding table based on the target SPI and the target SI to determine the target next-hop information.

Furthermore, because the control node may learn all information in an SFC network, next-hop information corresponding to each piece of route prefix information may be learned according to the determined packet forwarding rule (or referred to as the first mapping relationship), therefore, the first packet can reach corresponding next-hop nodes and finally reach a target node (namely, an SFC node) using a next-hop node of each next-hop node. As shown in FIG. 1, a packet can reach the SF1 from the SFF1 using the three channels shown in FIG. 1. The control node may send a traffic allocation policy to the first service function forwarding node, to instruct the first service function forwarding node to forward, on each channel and based on an allocation proportion indicated by the traffic allocation policy, traffic that is carried in the packet such that the packet finally reaches the target node SF1.

Optionally, at least one channel is connected between the first service function forwarding node and a target node, the target node is determined by the control node, and the first service function forwarding node forwards the first packet to the target node based on the target next-hop information.

The extended community attribute field includes a MOD field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

Further, the Flags field in the extended community attribute field may further include the MOD field, where the MOD field carries the traffic allocation policy. For example, if MOD=0, it indicates that only a hit active entry is used, if MOD=1, it indicates that a plurality of hit load-balancing entries may be used for equal-cost load sharing, or if MOD=2, it indicates that a plurality of hit entries may be used for non-equal-cost load sharing.

In this embodiment of the present disclosure, the first service function forwarding node may determine the target route prefix information based on the packet forwarding rule.

When the target route prefix information corresponds to only one piece of target next-hop information (that is, only one entry is found), the entry is directly used, regardless of a value of the MOD field, to forward the first packet to a node to which the target next-hop information points.

When the target route prefix information corresponds to a plurality of pieces of target next-hop information (that is, a plurality of entries can be found), it indicates that the first packet can finally reach a same SFC node (namely, the target node) from the first service function forwarding node using a plurality of next-hop nodes. The target node may be a service function node, or a service function forwarding node, and this is not particularly limited in the present disclosure.

In this case, if the value of the MOD field is 1, the plurality of entries are ranked according to a conventional BGP path selection rule, and an entry ranked first is selected as an entry to be used, and if a plurality of entries are selected, a load-sharing manner is used for the plurality of selected entries. For example, the first packet is forwarded on the SFF1 to the SF1 using the foregoing three channels, and if one entry is selected, the entry is directly used, to forward the first packet to an SF to which the entry points.

If the value of the MOD field is 2, the plurality of hit entries may all be used for forwarding, and a forwarding proportion of each entry is determined by the first service function forwarding node based on a weight value. Alternatively, if the value of the MOD field is 2, an active entry and a standby entry may be determined from the plurality of hit entries based on a cost value. An active channel and a standby channel used for forwarding are determined.

In addition, optionally, the first service function forwarding node may further determine a bandwidth value of each channel based on a bandwidth value, to limit bandwidth of each channel within a preset range.

It should be understood that, the foregoing listed bandwidth value, weight value, and cost value may be determined using the route attribute information described in the foregoing. For brevity, a detailed description of determining, by the first service function forwarding node, the forwarding proportion of each entry based on the weight value is omitted herein.

It should be understood that, the foregoing listed traffic allocation policy and the specific method for allocating, using a traffic allocation policy, traffic carried by a packet are merely examples for description, but shall not be construed as any limitation on the present disclosure. For example, the control node may control packet forwarding using more traffic allocation policies.

It should be further understood that, the foregoing listed method for carrying the match item and the route prefix information respectively using the Flow NLRI field and the extended community attribute field in the BGP Flow Spec packet is merely an example for description, but shall not be construed as any limitation on the present disclosure. The present disclosure does not exclude a possibility that the match item and the route prefix information (namely, the packet forwarding rule) are carried using other existing BGP packets or other existing or new fields in the BGP packet.

Therefore, according to the SFC-based packet forwarding method in this embodiment of the present disclosure, the control node and the service function forwarding node synchronize a packet forwarding rule such that the service function forwarding node can direct a packet according to the packet forwarding rule, to direct a common packet from the non-SFC forwarding plane to the SFC forwarding plane, and the packet is transmitted based on a specified SFP. In addition, an allocation proportion of traffic in each channel is further controlled using the traffic allocation policy delivered by the control node such that traffic is more evenly and more appropriately allocated on an entire SFC network.

Case 2

Figure 4:
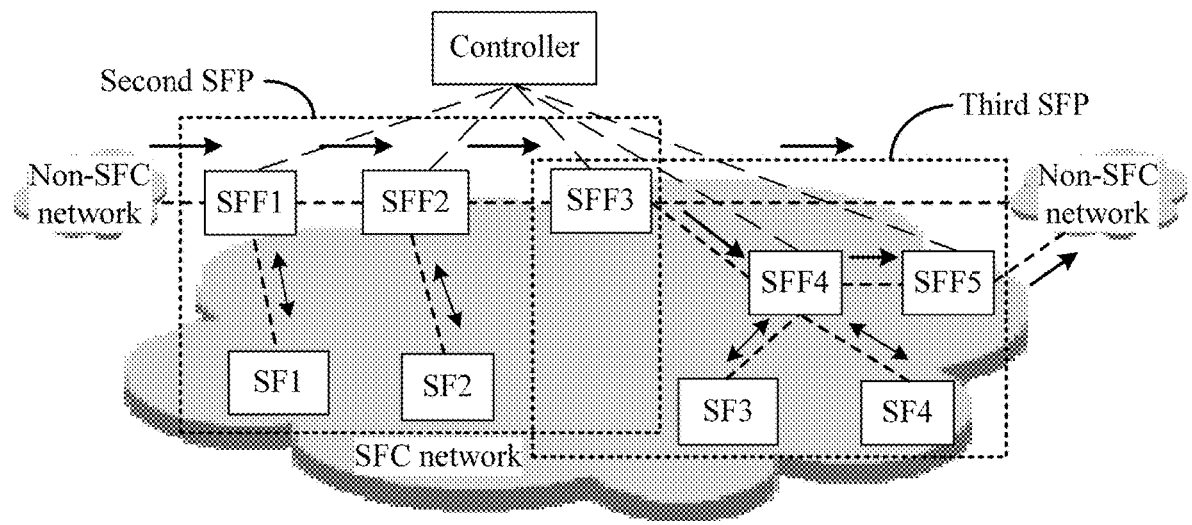
FIG. 4 is a schematic diagram of another application scenario according to an embodiment of the present disclosure.

Case 2 may correspond to a scenario shown in FIG. 4. FIG. 4 is a schematic diagram of another application scenario according to an embodiment of the present disclosure. In another embodiment, the first packet is an SFC packet. If the first packet needs to be forwarded from one SFP (denoted as a second SFP for ease of differentiation and description) to another SFP (denoted as a third SFP for ease of differentiation and description), the first packet also needs to be directed. For example, as shown in FIG. 4, when the first packet is forwarded from the last service function forwarding node SFF2 in the second SFP to the third SFP, the first packet needs to be directed, to match an SFP for the first packet. In addition, a source SPI and a source SI in the header of the first packet are deleted based on a SPI of the matched SFP, and a target SPI and a target SI are added. In this case, the packet forwarding rule may include a second mapping relationship between a match item of traffic characteristic information of an SFC packet and route prefix information.

Further, as shown in FIG. 4, it is assumed that SFF1→SF1→SFF1→SFF2→SF2→SFF2→SFF3 may form the second SFP, and SFF3→SFF4→SF3→SFF4→SF4→SFF4→SFF5 may form the third SFP. The SFF3 is a node on which the second SFP and the third SFP intersect with each other. When the first packet enters the SFF3, the source SPI and the source SI (for example, the source SPI and the source SI corresponding to the first packet may be respectively denoted as a first SPI and a first SI) in the header of the first packet may be parsed, and traffic matching is performed for the first packet based on the second mapping relationship.

Optionally, the sending, by the control node, the packet forwarding rule to a first service function forwarding node in step S220 includes receiving, by the first service function forwarding node, a BGP Flow Spec packet sent by the control node, where the BGP Flow Spec packet includes a Flow Spec NLRI field and an extended community attribute field, the Flow Spec NLRI field carries the match item of the traffic characteristic information of the SFC packet, the extended community attribute field includes a SPI field and an SI field, the SPI field carries the SPI, and the SI field carries the SI.

Further, the BGP Flow Spec packet includes an MP_REACH_NLRI attribute field, and this attribute field includes an NLRI field (namely, the Flow Spec NLRI field). In this embodiment of the present disclosure, the NLRI carries the match item, and the extended community attribute field carries the route prefix information.

It should be understood that, the foregoing listed method for carrying the match item and the route prefix information respectively using the Flow NLRI field and the extended community attribute field in the BGP Flow Spec packet is merely an example for description, but shall not be construed as any limitation on the present disclosure. The present disclosure does not exclude a possibility that the match item and the route prefix information (namely, the packet forwarding rule) are carried using other existing BGP packets or other existing or new fields in the BGP packet.

Optionally, the match item of the traffic characteristic information of the SFC packet includes at least one of the following a packet type, a source SPI, and a source SPI and a source SI.

The packet type indicates whether the first packet is an SFC packet or a non-SFC packet (for example, an IP packet). The packet type may be determined based on whether the header of the first packet carries a SPI and an SI. A specific method for determining whether the first packet is an SFC packet is described above. For brevity, details are not described herein again.

Optionally, the receiving, by the first service function forwarding node, a first packet, where a header of the first packet carries traffic characteristic information of the first packet in step S230 includes receiving, by the first service function forwarding node, the first packet, where the header of the first packet carries a first SPI and a first SI, the first SPI is a source SPI corresponding to the first packet, and the first SI is a source SI corresponding to the first packet, the receiving, by the first service function forwarding node, a first packet, where a header of the first packet carries traffic characteristic information of the first packet in step S240 includes receiving, by the first service function forwarding node, the first packet, where the header of the first packet carries a first SPI and a first SI, the first SPI is a source SPI corresponding to the first packet, and the first SI is a source SI corresponding to the first packet, and determining, by the first service function forwarding node according to the packet forwarding rule, target route prefix information corresponding to the traffic characteristic information of the first packet includes, when a packet type of the first packet is an SFC packet, determining, by the first service function forwarding node, the target SPI and the target SI based on the second mapping relationship, determining, by the first service function forwarding node, the target SPI and the target SI based on the first SPI and the second mapping relationship, or determining, by the first service function forwarding node, the target SPI and the target SI based on the first SPI, the first SI, and the second mapping relationship.

Further, when the header of the first packet carries the first SPI and the first SI, the first service function forwarding node may determine that the first packet is an SFC packet. The first service function forwarding node may directly direct the first packet, or direct the first packet based on specific content of the SPI and the SI that are carried in the first packet.

For example, when traffic of a plurality of packets (for example, including the first packet) needs to be converged on a same SFP (for example, the third SFP), filtering may be performed directly based on packet types of the packets, to filter out a non-SFC packet and directly direct an SFC packet to the third SFP.

Further, when the match item is the packet type, the match item may further include any one of one or more match items of the traffic characteristic information of the non-SFC packet. Any one (for example, the match item of the traffic characteristic information of the non-SFC packet listed in Case 1) of the one or more match items of the traffic characteristic information of the non-SFC packet and the packet type are simultaneously used as a filtering condition. To be specific, when the packet is an SFC packet, the traffic characteristic information of the packet is additionally considered, to match an appropriate SFP for the packet.

For another example, when traffic of a plurality of packets (for example, including the first packet) needs to be converged on a plurality of SFPs, the first service function forwarding node may match an SFP for the first packet based on the specific content of the SPI and the SI that are carried in the first packet.

Further, the first service function forwarding node may perform matching based on the first SPI (namely, the source SPI corresponding to the first packet) or based on the first SPI and the first SI (namely, the source SI corresponding to the first packet). The first SPI and the first SI are used to identify an SFP (for example, the second SFP) in which the first packet currently resides. The first service function forwarding node needs to determine the target SPI and the target SI based on the first SPI, the first SI, and the second mapping relationship, that is, determine another SFP (for example, the third SFP) to which the first packet is directed. It should be understood that, the first service function forwarding node may be connected to at least two SFPs, or the first service function forwarding node may be a node on which at least two SFPs intersect with each other. For example, the first service function forwarding node may be a tail node of the second SFP, and may also be a head node of the third SFP, or the first service function forwarding node may be a tail node of the second SFP, and may also be an intermediate node of the third SFP, or the first service function forwarding node may be an intermediate node of the second SFP, and may also be a head node of the third SFP, or the first service function forwarding node may be both an intermediate node of the second SFP and an intermediate node of the third SFP.

It is assumed that the first service function forwarding node is a tail node of the second SFP and also a head node of the third SFP. When the first packet enters the first service function forwarding node, traffic matching is performed first. In the second mapping relationship, the match item is the source SPI and the source SI. The first packet is directed, by matching the source SPI and the source SI, to a next-hop node to which the target SPI and the target SI point.

Herein, it needs to be noted that the source SPI and the source SI are used to indicate an SFP (denoted as a source SFP, corresponding to the source SPI and the source SI) in which the packet resides when the packet enters the first service function forwarding node, and a location of the first service function forwarding node in the source SFP. The first SPI and the first SI carried in the header of the first packet are the source SPI and the source SI corresponding to the first packet. The source SFP (namely, the second SFP) in which the first packet resides may be determined based on the first SPI and the first SI.

The first service function forwarding node may determine the target SPI and the target SI based on the second mapping relationship. Then the target next-hop information may be determined based on a locally stored routing table.

A specific method for determining, by the first service function forwarding node, the target next-hop information based on the target SPI and the target SI, and forwarding a packet based on the target next-hop information is described above. For brevity, details are not described herein again.

It needs to be noted that, the foregoing listed process in which the first service function forwarding node serves as the tail node of the second SFP and also serves as the head node of the third SFP to direct the first packet from the second SFP to the third SFP is merely an example for description. When the first service function forwarding node is an intermediate node of the second SFP or an intermediate node of the third SFP, if the first packet needs to be specially directed so that the first packet is forwarded from the second SFP to the third SFP, the method in this embodiment of the present disclosure is also applicable. A specific process in which the first service function forwarding node serves as an intermediate node of the second SFP or an intermediate node of the third SFP to forward the first packet is similar to a specific process in which the first service function forwarding node serves as the tail node of the second SFP and also serves as the head node of the third SFP to forward the first packet. For brevity, details are not described herein again.

Optionally, the BGP Flow Spec NLRI field includes at least one TLV field, and each TLV field carries one type of the match item of the traffic characteristic information of the SFC packet.

Table 3 shows specific content and a specific function of each field when the match item of the traffic characteristic information of the SFC packet is carried using the TLV.

TABLE 3

| Type field | Value field | Function description |
| --- | --- | --- |
| Type-1 | The Value field is null. | Used to match an SFC packet rather than any non-SFC packet |
| Type-2 | A three-byte SPI | Used to match a SPI field in an SFC packet, regardless of an SI field |
| Type-3 | A three-byte SPI plus a one-byte SI | Used to match a SPI field and an SI field in an SFC packet. Matching is successful only when both fields are matched. |

It should be understood that, the foregoing listed match items used to match traffic and the correspondence between each match item and each type are merely examples for description, but shall not be construed as any limitation on the present disclosure. It should be further understood that, the method for adding the TLV in the BGP Flow Spec NLRI field to carry the match item is merely an example for description, but shall not be construed as any limitation on the present disclosure. The present disclosure does not exclude carrying match item of the traffic characteristic information of the SFC packet via another existing field or a new field.

Therefore, according to the SFC-based packet forwarding method in this embodiment of the present disclosure, the control node and the service function forwarding node synchronize a packet forwarding rule such that the service function forwarding node can direct a packet according to the packet forwarding rule, to direct an SFC packet from one SFP to another SFP, and the packet is transmitted based on the specified SFP. In addition, the SFC packet can be directly matched using a newly-added match item of the SPI and the SI, to avoid traffic matching that is needed for a non-SFC packet when the packet enters the first node of the SFC, thereby greatly reducing a matching workload and improving packet forwarding efficiency.

The foregoing describes in detail the SFC-based packet forwarding method in this embodiment of the present disclosure with reference to FIG. 2 to FIG. 4. The following describes, in detail with reference to FIG. 5 to FIG. 9, an SFC-based packet forwarding apparatus and system according to embodiments of the present disclosure.

Figure 5:
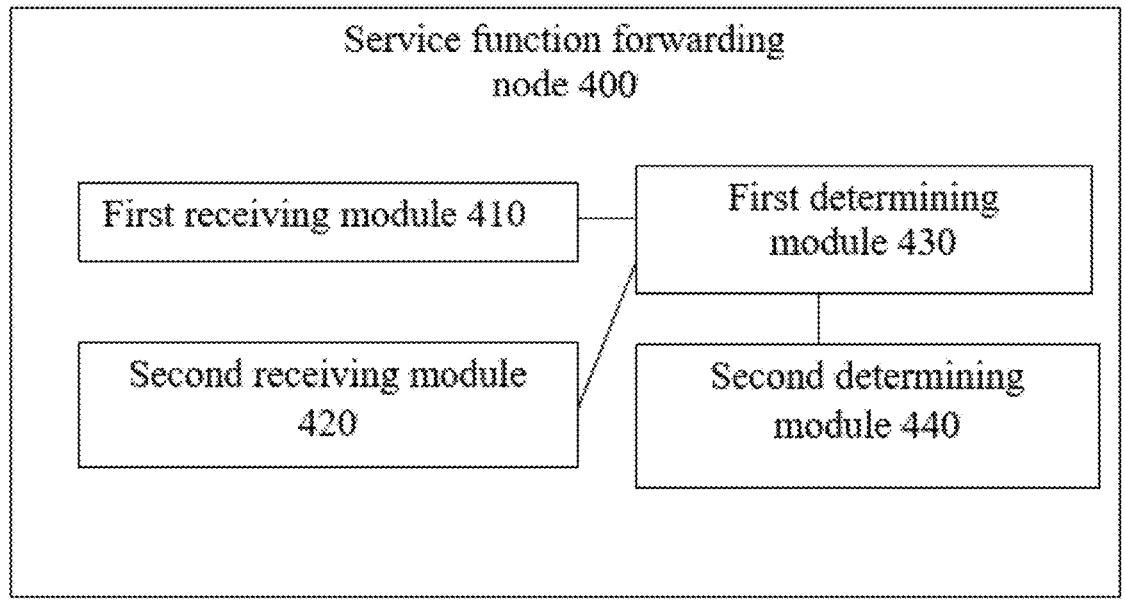
FIG. 5 is a schematic block diagram of a service function forwarding node according to an embodiment of the present disclosure.

FIG. 5 is a schematic block diagram of a service function forwarding node 400 according to an embodiment of the present disclosure. As shown in FIG. 5, the service function forwarding node 400 includes a first receiving module 410, a second receiving module 420, a first determining module 430, and a second determining module 440.

The first receiving module 410 is configured to receive a packet forwarding rule sent by a control node, where the packet forwarding rule is used to indicate a mapping relationship between a match item of traffic characteristic information of a packet and route prefix information.

The second receiving module 420 is configured to receive a first packet, where a header of the first packet carries traffic characteristic information of the first packet.

The first determining module 430 is configured to determine, according to the packet forwarding rule, target route prefix information corresponding to the traffic characteristic information of the first packet, where the service function forwarding node stores a mapping relationship between at least one piece of route prefix information and at least one piece of next-hop information, the at least one piece of next-hop information is in one-to-one correspondence with at least one next-hop node that is connected to the service function forwarding node, each piece of next-hop information indicates an address of a corresponding next-hop node, and the at least one piece of route prefix information includes the target route prefix information.

The second determining module 440 is configured to determine the target next-hop information based on the target route prefix information, and forward the first packet based on the target next-hop information.

Optionally, the route prefix information includes an SPI and an SI, the SPI identifies an SFP in the SFC, and the SI indicates a location of the service function forwarding node 400 in the SFP, and the first receiving module 410 is further configured to receive a BGP Flow Spec packet sent by the control node, where the BGP Flow Spec packet includes a Flow Spec NLRI field and an extended community attribute field, the Flow Spec NLRI field carries the match item of the traffic characteristic information of the packet, the extended community attribute field includes a SPI field and an SI field, the SPI field carries the SPI, and the SI field carries the SI.

Optionally, the packet forwarding rule includes a first mapping relationship between a match item of traffic characteristic information of a non-SFC packet and route prefix information, and the target route prefix information includes a target SPI and a target SI, the service function forwarding node 400 further includes a third determining module (not shown) configured to, when the header of the first packet does not carry an SFC packet identifier, determine that the first packet is a non-SFC packet, and the first determining module 430 is further configured to determine the target SPI and the target SI based on the first mapping relationship and the traffic characteristic information of the first packet.

Optionally, at least one channel is connected between the first service function forwarding node 400 and a target node, the target node is determined by the control node, and the first service function forwarding node forwards the first packet to the target node based on the target next-hop information, and the extended community attribute field includes a MOD field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

Optionally, the packet forwarding rule includes a second mapping relationship between a match item of traffic characteristic information of an SFC packet and route prefix information, and the match item of the traffic characteristic information of the SFC packet includes at least one of the following a packet type, a source SPI, and a source SPI and a source SI, where the source SPI is used to identify a source SFP in which the SFC packet resides, and the source SI is used to indicate a location, of a service function forwarding node on which the SFC packet resides, in the source SFP.

Optionally, the BGP Flow Spec NLRI field includes at least one TLV field, and each TLV field carries one type of the match item of the traffic characteristic information of the SFC packet.

Optionally, the target route prefix information includes a target SPI and a target SI, the header of the first packet carries a first SPI and a first SI, the first SPI is a source SPI corresponding to the first packet, and the first SI is a source SI corresponding to the first packet, and the first determining module 430 is further configured to, when a packet type of the first packet is an SFC packet, determine the target SPI and the target SI based on the second mapping relationship, the first determining module 430 is further configured to determine the target SPI and the target SI based on the first SPI and the second mapping relationship, or the first determining module 430 is further configured to determine the target SPI and the target SI based on the first SPI, the first SI, and the second mapping relationship.

The SFC-based service function forwarding node 400 in this embodiment of the present disclosure may correspond to the first service function forwarding node in the SFC-packet forwarding method in the embodiment of the present disclosure, and modules and the foregoing operations and/or functions of the service function forwarding node 400 are used to implement corresponding processes of the packet forwarding method in FIG. 2. For brevity, details are not described herein again.

Therefore, according to the service function forwarding node in this embodiment of the present disclosure, the control node and the service function forwarding node synchronize a packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the technical solution of this embodiment are more outstanding convenience, time saving, and labor saving. In addition, automatic configuration performed using a machine also reduces an error rate of manual configuration. Furthermore, because dynamic adjustment can be performed based on a status of network traffic, flexibility is very high.

Figure 6:
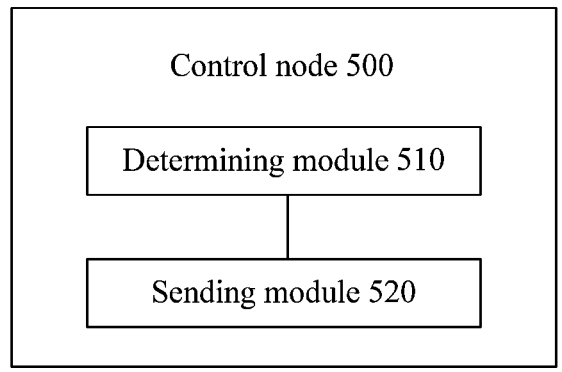
FIG. 6 is a schematic block diagram of a control node according to another embodiment of the present disclosure.

FIG. 6 is a schematic block diagram of a control node 500 according to another embodiment of the present disclosure. As shown in FIG. 6, the control node 500 includes a determining module 510 and a sending module 520.

The determining module 510 is configured to determine a packet forwarding rule, where the packet forwarding rule is used to indicate a mapping relationship between traffic characteristic information of a packet and route prefix information, the route prefix information corresponds to next-hop information, and the next-hop information indicates an address of a next-hop node.

The sending module 520 is configured to send the packet forwarding rule to a first service function forwarding node such that the first service function forwarding node forwards a packet according to the packet forwarding rule.

Optionally, the route prefix information includes an SPI and a SI, the SPI identifies an SFP in the SFC, and the SI indicates a location of the first service function forwarding node in the SFP, and the sending module 520 is further configured to send a BGP Flow Spec packet to the first service function forwarding node, the BGP Flow Spec packet includes a Flow Spec NLRI field and an extended community attribute field, the Flow Spec NLRI field carries a match item of the traffic characteristic information of the packet, the extended community attribute field includes an SPI field and an SI field, the SPI field carries the SPI, and the SI field carries the SI.

Optionally, the packet forwarding rule includes a first mapping relationship between a match item of traffic characteristic information of a non-SFC packet and route prefix information, at least one channel is connected between the first service function forwarding node and a target node, the target node is determined by the control node 500, and the first service function forwarding node forwards the first packet to the target node based on the target next-hop information, and the extended community attribute field includes a MOD field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

Optionally, the packet forwarding rule includes a second mapping relationship between a match item of traffic characteristic information of an SFC packet and route prefix information, and the match item of the traffic characteristic information of the SFC packet includes at least one of the following a packet type, a source SPI, and a source SPI and a source SI, where the source SPI is used to identify a source SFP in which the SFC packet resides, and the source SI is used to indicate a location, of a service function forwarding node on which the SFC packet resides, in the source SFP.

Optionally, the BGP Flow Spec NLRI field includes at least one TLV field, and each TLV field carries one type of the match item of the traffic characteristic information of the SFC packet.

The SFC-based control node 500 in this embodiment of the present disclosure may correspond to the control node in the SFC-packet forwarding method in the embodiment of the present disclosure, and modules and the foregoing operations and/or functions of the control node 500 are used to implement corresponding processes of the packet forwarding method in FIG. 2. For brevity, details are not described herein again.

Therefore, according to the control node in this embodiment of the present disclosure, the control node and the first service function forwarding node synchronize a packet forwarding rule such that the first service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the technical solution of this embodiment are more outstanding, convenience, time saving, and labor saving. In addition, automatic configuration performed using a machine also reduces an error rate of manual configuration. Furthermore, because dynamic adjustment can be performed based on a status of network traffic, flexibility is very high.

Figure 7:
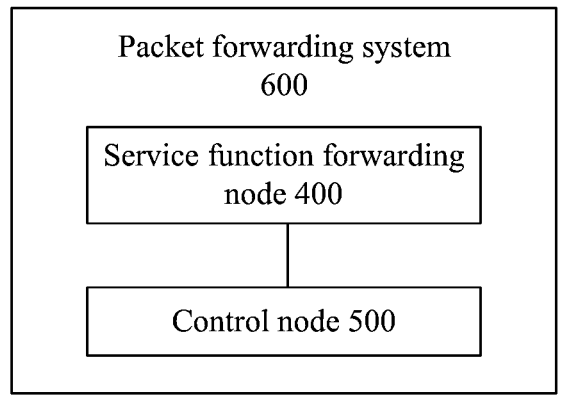
FIG. 7 is a schematic block diagram of an SFC-based packet forwarding system according to an embodiment of the present disclosure.

FIG. 7 is a schematic block diagram of an SFC-based packet forwarding system 600 according to an embodiment of the present disclosure. As shown in FIG. 7, the packet forwarding system 600 includes the service function forwarding node 400 described in the foregoing embodiment and the control node 500 described in the foregoing embodiment.

It should be understood that modules and other operations and/or functions of the packet forwarding system 600 are used to implement corresponding processes of the packet forwarding method in FIG. 2. For brevity, details are not described herein again.

Therefore, according to the packet forwarding system in this embodiment of the present disclosure, the control node and the service function forwarding node synchronize a packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the technical solution of this embodiment are more outstanding, convenience, time saving, and labor saving. In addition, automatic configuration performed using a machine also reduces an error rate of manual configuration. Furthermore, because dynamic adjustment can be performed based on a status of network traffic, flexibility is very high.

Figure 8:
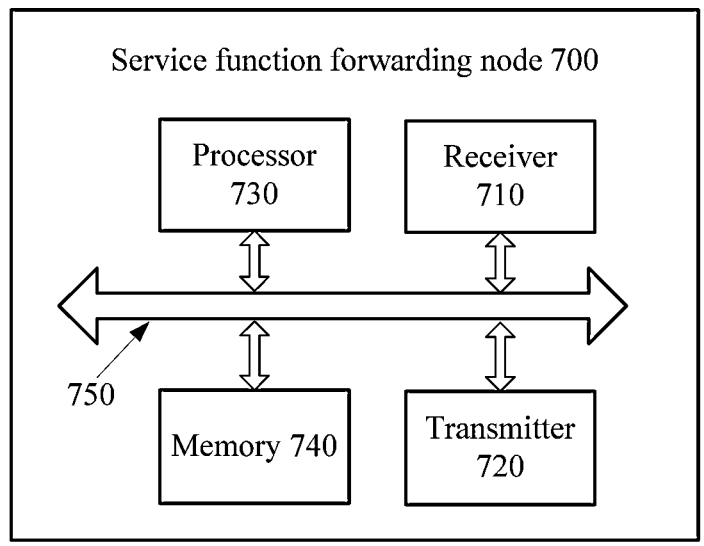
FIG. 8 is another schematic block diagram of a service function forwarding node according to an embodiment of the present disclosure.

FIG. 8 is another schematic block diagram of a service function forwarding node 700 according to an embodiment of the present disclosure. As shown in FIG. 8, the service function forwarding node 700 includes a receiver 710, a transmitter 720, a processor 730, a memory 740, and a bus system 750. The receiver 710, the transmitter 720, the processor 730, and the memory 740 are connected to each other using the bus system 750. The memory 740 is configured to store an instruction. The processor 730 is configured to execute the instruction stored in the memory 740 to control the receiver 740 to receive a signal and to control the transmitter 720 to send a signal.

The receiver 710 is configured to receive a packet forwarding rule sent by a control node, where the packet forwarding rule is used to indicate a mapping relationship between a match item of traffic characteristic information of a packet and route prefix information.

The receiver 710 is further configured to receive a first packet, where a header of the first packet carries traffic characteristic information of the first packet.

The processor 730 is configured to determine, according to the packet forwarding rule, target route prefix information corresponding to the traffic characteristic information of the first packet, where the service function forwarding node stores a mapping relationship between at least one piece of route prefix information and at least one piece of next-hop information, the at least one piece of next-hop information is in one-to-one correspondence with at least one next-hop node that is connected to the service function forwarding node, each piece of next-hop information indicates an address of a corresponding next-hop node, and the at least one piece of route prefix information includes the target route prefix information.

The processor 730 is further configured to determine the target next-hop information based on the target route prefix information, and forward the first packet based on the target next-hop information.

It should be understood that in this embodiment of the present disclosure, the processor 730 may be a central processing unit (CPU), or the processor 730 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor 730 may be any conventional processor or the like.

The memory 740 may include a read-only memory (ROM) and a random access memory (RAM), and provides an instruction and data to the processor 730. A part of the memory 740 may further include a non-volatile RAM (NVRAM). For example, the memory 740 may further store information about a device type.

In addition to a data bus, the bus system 750 may further include a power bus, a control bus, a status signal bus, and the like. However, for clear description, various types of buses in the figure are denoted as the bus system 750.

During implementation, the steps in the foregoing methods may be completed by an integrated logic circuit of hardware in the processor 730 or by an instruction in a software form. The steps of the positioning methods disclosed in the embodiments of the present disclosure may be directly embodied as being executed by a hardware processor, or executed by a combination of hardware of a processor and a software module. The software module may be located in a mature storage medium in the art, such as a RAM, a flash memory, a ROM, a programmable ROM (PROM) or an electrically erasable PROM (EEPROM), or a register. The storage medium is located in the memory 740. The processor 730 reads information in the memory 740, and completes the steps of the methods in combination with hardware of the processor 730. To avoid repetition, details are not described herein again.

Optionally, the route prefix information includes an SPI and an SI, the SPI identifies an SFP in the SFC, and the SI indicates a location of the service function forwarding node 700 in the SFP, and the receiver 710 is further configured to receive a BGP Flow Spec packet sent by the control node, the BGP Flow Spec packet includes a Flow Spec NLRI field and an extended community attribute field, the Flow Spec NLRI field carries the match item of the traffic characteristic information of the packet, the extended community attribute field includes a SPI field and an SI field, the SPI field carries the SPI, and the SI field carries the SI.

Optionally, the packet forwarding rule includes a first mapping relationship between a match item of traffic characteristic information of a non-SFC packet and route prefix information, and the target route prefix information includes a target SPI and a target SI, the processor 730 is further configured to, when the header of the first packet does not carry an SFC packet identifier, determine that the first packet is a non-SFC packet, and the processor 730 is further configured to determine the target SPI and the target SI based on the first mapping relationship and the traffic characteristic information of the first packet.

Optionally, at least one channel is connected between the first service function forwarding node 700 and a target node, the target node is determined by the control node, and the first service function forwarding node forwards the first packet to the target node based on the target next-hop information, and the extended community attribute field includes a MOD field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

Optionally, the packet forwarding rule includes a second mapping relationship between a match item of traffic characteristic information of an SFC packet and route prefix information, and the match item of the traffic characteristic information of the SFC packet includes at least one of the following a packet type, a source SPI, and a source SPI and a source SI, where the source SPI is used to identify a source SFP in which the SFC packet resides, and the source SI is used to indicate a location, of a service function forwarding node on which the SFC packet resides, in the source SFP.

Optionally, the BGP Flow Spec NLRI field includes at least one TLV field, and each TLV field carries one type of the match item of the traffic characteristic information of the SFC packet.

Optionally, the target route prefix information includes a target SPI and a target SI, the header of the first packet carries a first SPI and a first SI, the first SPI is a source SPI corresponding to the first packet, and the first SI is a source SI corresponding to the first packet, and the processor 730 is further configured to, when a packet type of the first packet is an SFC packet, determine the target SPI and the target SI based on the second mapping relationship, or the processor 730 is further configured to determine the target SPI and the target SI based on the first SPI and the second mapping relationship, or the processor 730 is further configured to determine the target SPI and the target SI based on the first SPI, the first SI, and the second mapping relationship.

The SFC-based service function forwarding node 700 in this embodiment of the present disclosure may correspond to the first service function forwarding node in the SFC-packet forwarding method in the embodiment of the present disclosure, and modules and the foregoing operations and/or functions of the service function forwarding node 700 are used to implement corresponding processes of the packet forwarding method in FIG. 2. For brevity, details are not described herein again.

Therefore, according to the service function forwarding node in this embodiment of the present disclosure, the control node and the service function forwarding node synchronize a packet forwarding rule such that the service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the technical solution of this embodiment are more outstanding convenience, time saving, and labor saving. In addition, automatic configuration performed using a machine also reduces an error rate of manual configuration. Furthermore, because dynamic adjustment can be performed based on a status of network traffic, flexibility is very high.

Figure 9:
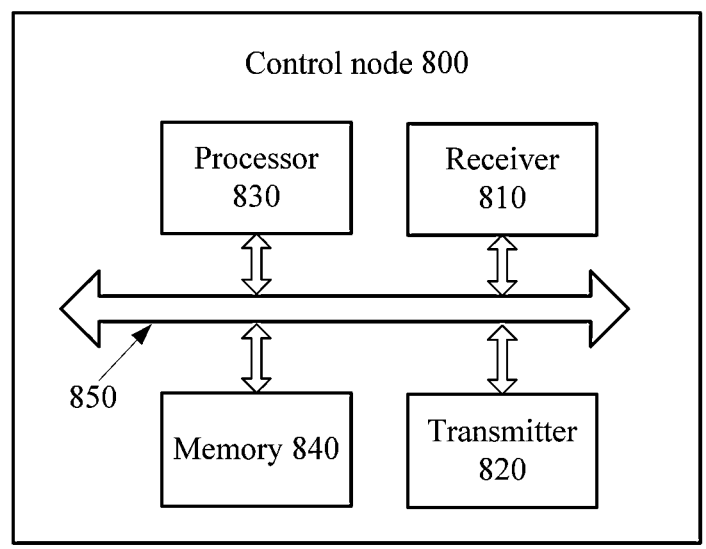
FIG. 9 is another schematic block diagram of a control node according to another embodiment of the present disclosure.

FIG. 9 is another schematic block diagram of a service function forwarding node according to another embodiment of the present disclosure. As shown in FIG. 9, the control node 800 includes a receiver 810, a transmitter 820, a processor 830, a memory 840, and a bus system 850. The receiver 810, the transmitter 820, the processor 830, and the memory 840 are connected to each other using the bus system 850. The memory 840 is configured to store an instruction. The processor 830 is configured to execute the instruction stored in the memory 840, to control the receiver 840 to receive a signal and to control the transmitter 820 to send a signal.

The processor 830 is configured to determine a packet forwarding rule, where the packet forwarding rule is used to indicate a mapping relationship between traffic characteristic information of a packet and route prefix information, the route prefix information corresponds to next-hop information, and the next-hop information indicates an address of a next-hop node.

The transmitter 820 is configured to send the packet forwarding rule to a first service function forwarding node such that the first service function forwarding node forwards a packet according to the packet forwarding rule.

Optionally, the route prefix information includes an SPI and an SI, the SPI identifies an SFP in the SFC, and the SI indicates a location of the first service function forwarding node in the SFP, and the transmitter 820 is further configured to send a BGP Flow Spec packet to the first service function forwarding node, the BGP Flow Spec packet includes a Flow Spec NLRI field and an extended community attribute field, the Flow Spec NLRI field carries a match item of the traffic characteristic information of the packet, the extended community attribute field includes a SPI field and an SI field, the SPI field carries the SPI, and the SI field carries the SI.

Optionally, the packet forwarding rule includes a first mapping relationship between a match item of traffic characteristic information of a non-SFC packet and route prefix information, at least one channel is connected between the first service function forwarding node and a target node, the target node is determined by the control node 800, and the first service function forwarding node forwards the first packet to the target node based on the target next-hop information, and the extended community attribute field includes a MOD field, the MOD field carries a traffic allocation policy, and the traffic allocation policy indicates a bandwidth value of each channel in the at least one channel, or the traffic allocation policy indicates an active channel and a standby channel that are used to transmit the first packet, or the traffic allocation policy indicates a proportion of traffic allocated to each channel in the at least one channel.

Optionally, the packet forwarding rule includes a second mapping relationship between a match item of traffic characteristic information of an SFC packet and route prefix information, and the match item of the traffic characteristic information of the SFC packet includes at least one of the following a packet type, a source SPI, and a source SPI and a source SI, where the source SPI is used to identify a source SFP in which the SFC packet resides, and the source SI is used to indicate a location, of a service function forwarding node on which the SFC packet resides, in the source SFP.

Optionally, the BGP Flow Spec NLRI field includes at least one TLV field, and each TLV field carries one type of the match item of the traffic characteristic information of the SFC packet.

The SFC-based control node 800 in this embodiment of the present disclosure may correspond to the control node in the SFC-packet forwarding method in the embodiment of the present disclosure, and modules and the foregoing operations and/or functions of the control node 800 are used to implement corresponding processes of the packet forwarding method in FIG. 2. For brevity, details are not described herein again.

Therefore, according to the control node in this embodiment of the present disclosure, the control node and the first service function forwarding node synchronize a packet forwarding rule such that the first service function forwarding node can direct a packet according to the packet forwarding rule, and the packet is transmitted based on a specified SFP. Compared with a manual static configuration method in the other approaches, manpower and a configuration time are greatly reduced. In particular, when a configuration workload is relatively heavy, advantages of the technical solution of this embodiment are more outstanding convenience, time saving, and labor saving. In addition, automatic configuration performed using a machine also reduces an error rate of manual configuration. Furthermore, because dynamic adjustment can be performed based on a status of network traffic, flexibility is very high.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may physically exist alone, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service function chaining (SFC)-based method associated with data forwarding, comprising:
    obtaining, by a control node, a packet forwarding rule, the packet forwarding rule indicating a mapping relationship between traffic characteristic information of a packet and information associated with a packet route, the information associated with the packet route comprising a service function path (SFP) identifier (SPI) and a service index (SI), the SPI identifying an SFP that the packet corresponds to, and the SI indicating a location of a node in the SFP; and
    sending, by the control node, the packet forwarding rule.

2. The method of claim 1, wherein the packet is a non-SFC packet.

3. The method of claim 1, wherein the packet is a SFC packet, and the traffic characteristic information of the SFC packet comprising:
    a packet type;
    a source SPI; and/or
    a source SI, the source SPI identifying a source SFP in which the SFC packet previously corresponds to, and the source SI indicating a location of a forwarding node on which the SFC packet previously resides in the source SFP.

4. The method of claim 1, wherein sending, by the control node, the packet forwarding rule comprises:
    sending, by the control node, a Border Gateway Protocol (BGP) flow specification (Flow Spec) packet, the BGP Flow Spec packet comprising a Flow Spec network layer reachability information (NLRI) field and an extended community attribute field, the Flow Spec NLRI field carrying the traffic characteristic information of the packet, the extended community attribute field comprising an SPI field carrying the SPI and an SI field carrying the SI.

5. The method of claim 1, wherein the packet forwarding rule is sent to a service function forwarding node such that the service function forwarding node forwards a packet according to the packet forwarding rule.

6. An apparatus, comprising:
    a memory configured to store computer-readable instructions; and
    at least one processor coupled to the memory, wherein the computer-readable instructions, when executed by the at least one processor, cause the apparatus to:
    obtain a packet forwarding rule, the packet forwarding rule indicating a mapping relationship between traffic characteristic information of a packet and information associated with a route, the information associated with the route comprising a service function path (SFP) identifier (SPI) and a service index (SI), the SPI identifying an SFP that the packet corresponds to, and the SI indicating a location of a node in the SFP; and
    send the packet forwarding rule.

7. The apparatus of claim 6, wherein the packet is a non-SFC packet.

8. The apparatus of claim 6, wherein the packet is a SFC packet, and the traffic characteristic information of the SFC packet comprising:
    a packet type;
    a source SPI; and/or
    a source SI, the source SPI identifying a source SFP in which the SFC packet previously corresponds to, and the source SI indicating a location of a forwarding node on which the SFC packet previously resides in the source SFP.

9. The apparatus of claim 6, wherein, to send the packet forwarding rule, the computer-readable instructions, when executed by the at least one processor, further cause the apparatus to:

send a Border Gateway Protocol (BGP) flow specification (Flow Spec) packet, the BGP Flow Spec packet comprising a Flow Spec network layer reachability information (NLRI) field and an extended community attribute field, the Flow Spec NLRI field carrying the traffic characteristic information of the packet, the extended community attribute field comprising an SPI field carrying the SPI and an SI field carrying the SI.

10. The apparatus of claim 6, wherein the packet forwarding rule is sent to a service function forwarding node such that the service function forwarding node forwards a packet according to the packet forwarding rule.

\* \* \* \* \*